United States Patent
Kwak et al.

(10) Patent No.: US 12,556,120 B2
(45) Date of Patent: Feb. 17, 2026

(54) ROLLABLE ELECTRONIC DEVICE INCLUDING GEAR ASSEMBLY

(71) Applicant: SAMSUNG ELECTRONICS CO., LTD., Suwon-si (KR)

(72) Inventors: Myunghoon Kwak, Suwon-si (KR); Junhyuk Kim, Suwon-si (KR); Hoyoung Jeong, Suwon-si (KR); Yangwook Kim, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 551 days.

(21) Appl. No.: 18/079,264

(22) Filed: Dec. 12, 2022

(65) Prior Publication Data

US 2023/0188072 A1     Jun. 15, 2023

Related U.S. Application Data

(63) Continuation of application No. PCT/KR2022/019255, filed on Nov. 30, 2022.

(30) Foreign Application Priority Data

Dec. 13, 2021 (KR) .................. 10-2021-0177578
Jan. 5, 2022 (KR) .................. 10-2022-0001736

(51) Int. Cl.
*H04M 1/18* (2006.01)
*G01M 13/021* (2019.01)
(Continued)

(52) U.S. Cl.
CPC ......... *H02P 23/183* (2016.02); *G01M 13/021* (2013.01); *G01M 13/028* (2013.01); *H04M 1/0237* (2013.01)

(58) Field of Classification Search
CPC ............ H04M 19/00; H04M 2201/08; H04M 2201/42; H04M 2250/20; H04M 2250/60;
(Continued)

(56) References Cited

U.S. PATENT DOCUMENTS 4,872,337 A     10/1989   Watts et al.
4,931,949 A      6/1990   Hernandez et al.
(Continued)

FOREIGN PATENT DOCUMENTS

JP    H06-94574 A2    4/1994
JP    2002-310854 A2  10/2002
(Continued)

OTHER PUBLICATIONS

Extended European Search Report dated Oct. 28, 2024 for EP Application No. 22907774.8.
(Continued)

*Primary Examiner* — Kawing Chan
*Assistant Examiner* — Charles S Laughlin
(74) *Attorney, Agent, or Firm* — Nixon & Vanderhye P.C.

(57) ABSTRACT

An electronic device may include a housing including a first housing and a second housing configured to receive at least a portion of the first housing and move with respect to the first housing, a display configured to be extended based on a slide of the first housing, a motor disposed in the housing, a gear assembly configured to move the first housing and including a first gear connected to the motor and a second gear configured to mesh with the first gear, at least one sensor disposed in the housing and configured to detect a driving state of at least a portion of the gear assembly, and at least one processor operatively connected with the motor and the at least one sensor. The at least one processor may sense, through the at least one sensor, a signal related to the driving state of at least the portion of the gear assembly
(Continued)

while at least one of the first gear or the second gear is driven and identify whether at least one of the first gear or the second gear is deformed based on the sensed signal.

18 Claims, 20 Drawing Sheets

(51) Int. Cl.
    *G01M 13/028*     (2019.01)
    *H02K 11/24*     (2016.01)
    *H02P 23/18*     (2016.01)
    *H04M 1/02*     (2006.01)

(58) Field of Classification Search
    CPC ...... H04M 1/0208; H04M 1/035; H04M 1/24; H04M 1/6066; H04M 1/72418; H04M 2201/06; H04M 2201/34; H04M 2250/18; H02K 7/116; H02K 7/06; H02K 49/10; H02K 11/0094; H02K 16/005; H02K 2213/09; H02K 49/04; H02K 49/046; H02K 7/104; H02K 7/12
    See application file for complete search history.

(56) References Cited

U.S. PATENT DOCUMENTS

| | | | |
|---|---|---|---|
| 10,747,269 | B1 | 8/2020 | Choi et al. |
| 11,528,352 | B1* | 12/2022 | Lim .................. H04M 1/0237 |
| 2020/0264660 | A1 | 8/2020 | Song et al. |
| 2020/0358887 | A1 | 11/2020 | Lee et al. |
| 2021/0181800 | A1 | 6/2021 | Ko et al. |
| 2022/0287193 | A1* | 9/2022 | Chun .................. H05K 5/0217 |

FOREIGN PATENT DOCUMENTS

| | | |
|---|---|---|
| JP | 2008-082759 A | 4/2008 |
| JP | 2009-103525 | 5/2009 |
| KR | 10-1999-0003452 | 1/1999 |
| KR | 10-2015-0121528 A | 10/2015 |
| KR | 10-2016-0132744 | 11/2016 |
| KR | 10-2020-0129645 A | 11/2020 |
| KR | 10-2021-0076492 | 6/2021 |
| KR | 10-2267742 | 6/2021 |
| KR | 10-2021-0116542 A | 9/2021 |
| KR | 10-2021-0148396 A | 12/2021 |

OTHER PUBLICATIONS

International Search Report dated Mar. 3, 2023 for PCT/KR2022/019255.
PCT Written Opinion dated Mar. 3, 2023 for PCT/KR2022/019255.

* cited by examiner

ROLLABLE ELECTRONIC DEVICE INCLUDING GEAR ASSEMBLY

CROSS-REFERENCE TO RELATED APPLICATIONS

This application is a continuation of International Application No. PCT/KR2022/019255, designating the United States, filed on Nov. 30, 2022, in the Korean Intellectual Property Receiving Office and claiming priority to Korean Patent Application No. 10-2021-0177578, filed on Dec. 13, 2021, in the Korean Intellectual Property Office, and to Korean Patent Application No. 10-2022-0001736, filed on Jan. 5, 2022, in the Korean Intellectual Property Office, the disclosures of which are all hereby incorporated by reference herein in their entireties.

BACKGROUND

Field

Certain example embodiments relate to an electronic device including a gear assembly.

Background

With the development of information and communication technology and semiconductor technology, various functions are being integrated into one portable electronic device. For example, an electronic device may implement not only communication functions but also entertainment functions, such as playing games, multimedia functions, such as playing music and videos, communication and security functions for mobile banking, and scheduling and e-wallet functions. Such electronic devices become compact enough for users to carry in a convenient way.

As mobile communication services extend up to multimedia service sectors, electronic devices require a larger display to allow users satisfactory use of multimedia services as well as voice call or text messaging services. This, however, trades off the trend of electronic devices being compact.

An electronic device (e.g., a portable terminal) includes a display with a flat surface or both a flat and curved surface. An electronic device including a display may have a limitation in realizing a screen larger than the size of the electronic device due to the fixed display structure. Accordingly, research has been conducted on electronic devices including a rollable display.

The rolling or slide of the electronic device may be performed automatically or semi-automatically by a driving force generated by a component of the electronic device. However, when the rolling or slide of the electronic device is repeatedly performed or a force is applied from the outside of the electronic device, a component (e.g., a gear) of the electronic device may be deformed (e.g., damaged or worn).

SUMMARY

According to various example embodiments, there may be provided an electronic device capable of reducing the deformation of the electronic device and determining the deformation of the electronic device.

The disclosure is not limited to the foregoing embodiments but various modifications or changes may rather be made thereto without departing from the spirit and scope of the disclosure.

According to an example embodiment, an electronic device may comprise a housing including a first housing and a second housing configured to receive at least a portion of the first housing and move with respect to the first housing, a display configured to be extended based on a slide of the first housing, a motor disposed in the housing, a gear assembly configured to move the first housing and including a first gear connected, directly or indirectly, to the motor and a second gear configured to mesh with the first gear, at least one sensor disposed in the housing and configured to detect whether the gear assembly is driven or a vibration, and at least one processor operatively connected with the motor and the at least one sensor. The at least one processor may obtain a sensing signal while at least one of the first gear or the second gear is driven, through the at least one sensor and, if the sensing signal includes at least one sensing value falling outside a set range, identify whether at least one of the first gear or the second gear is damaged based on the at least one sensing value.

According to an example embodiment, a method for controlling an electronic device including a housing moved through a gear assembly including a first gear and a second gear may comprise obtaining a sensing signal while the first gear and/or the second gear is driven, through at least one sensor and, if the sensing signal includes at least one sensing value falling outside a set range, identifying whether at least one of the first gear or the second gear is damaged based on the at least one sensing value.

According to an example embodiment, an electronic device may comprise a housing including a first housing and a second housing configured to receive at least a portion of the first housing and move with respect to the first housing, a display configured to be extended based on a slide of the first housing, a motor disposed in the housing, a gear assembly configured to move the first housing and including a first gear connected to the motor and a second gear configured to mesh with the first gear, at least one sensor disposed in the housing and configured to detect a driving state of at least a portion of the gear assembly, and at least one processor operatively connected with the motor and the at least one sensor. The at least one processor may sense a signal related to the driving state of at least the portion of the gear assembly while at least one of the first gear or the second gear is driven, through the at least one sensor, identify whether the at least one of the first gear or the second gear is deformed and/or a position of deformation based on the sensed signal, and control the display to display information indicating the identified presence or absence of deformation and/or position of deformation.

According to specific example embodiments, it is possible to identify whether the gear is damaged and the position of damage based on an abnormality signal included in a sensing signal.

Further, according to an example embodiment, it is possible to identify the type of a damaged gear based on the periodicity of an abnormality signal included in a sensing signal.

Further, according to an example embodiment, it is possible to prevent or reduce damage or wear to a gear, or prevent or reduce additional damage or wear, by changing the driving end position or changing the driving speed.

BRIEF DESCRIPTION OF THE DRAWINGS

The above and other aspects, features, and advantages of certain embodiments of the present disclosure will be more

DETAILED DESCRIPTION

Figure 1:
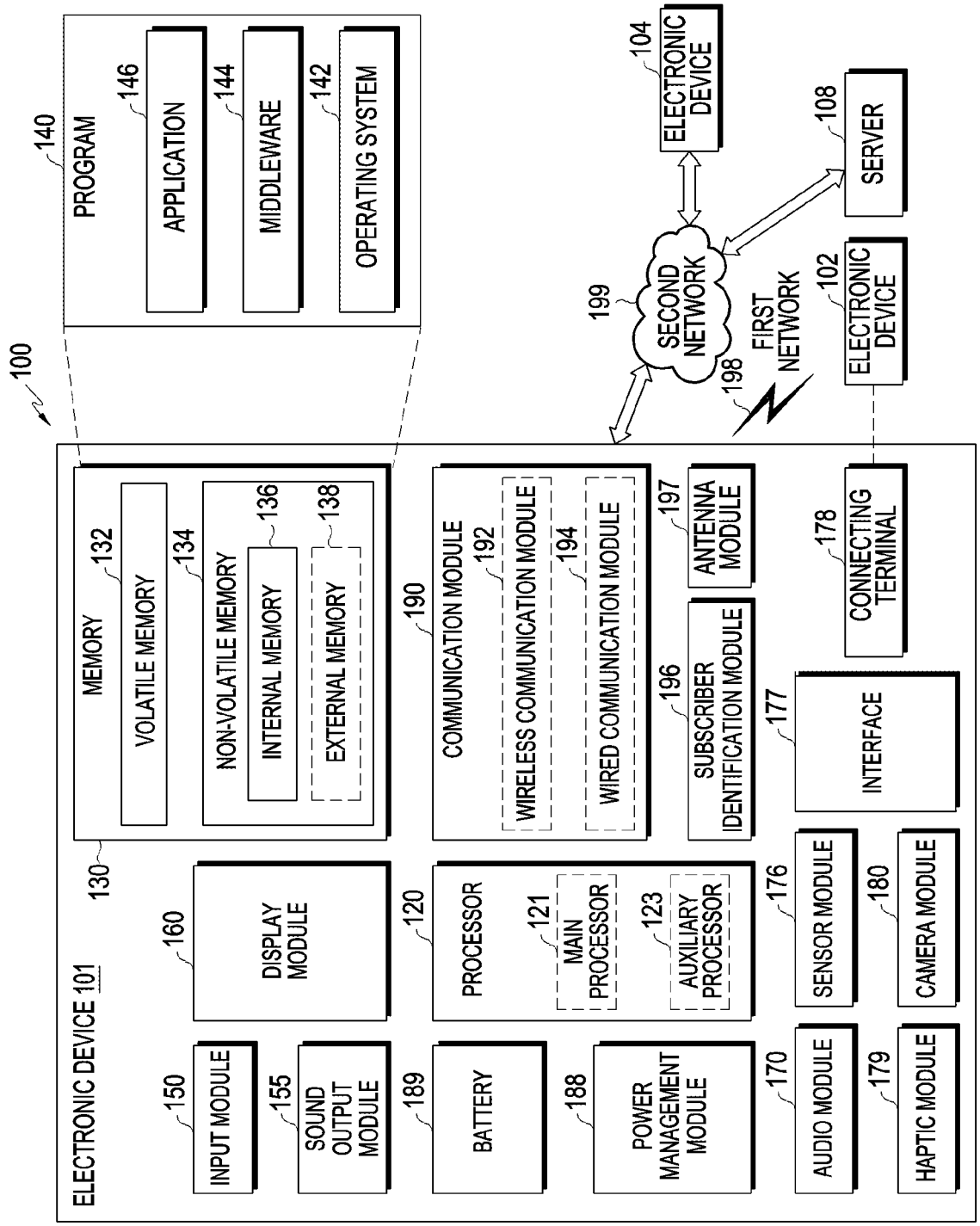
FIG. 1 is a block diagram illustrating an electronic device in a network environment according to various example embodiments.

FIG. 1 is a block diagram illustrating an electronic device in a network environment according to various example embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134 (which may include internal memory 136 and/or external memory 138). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an example embodiment, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
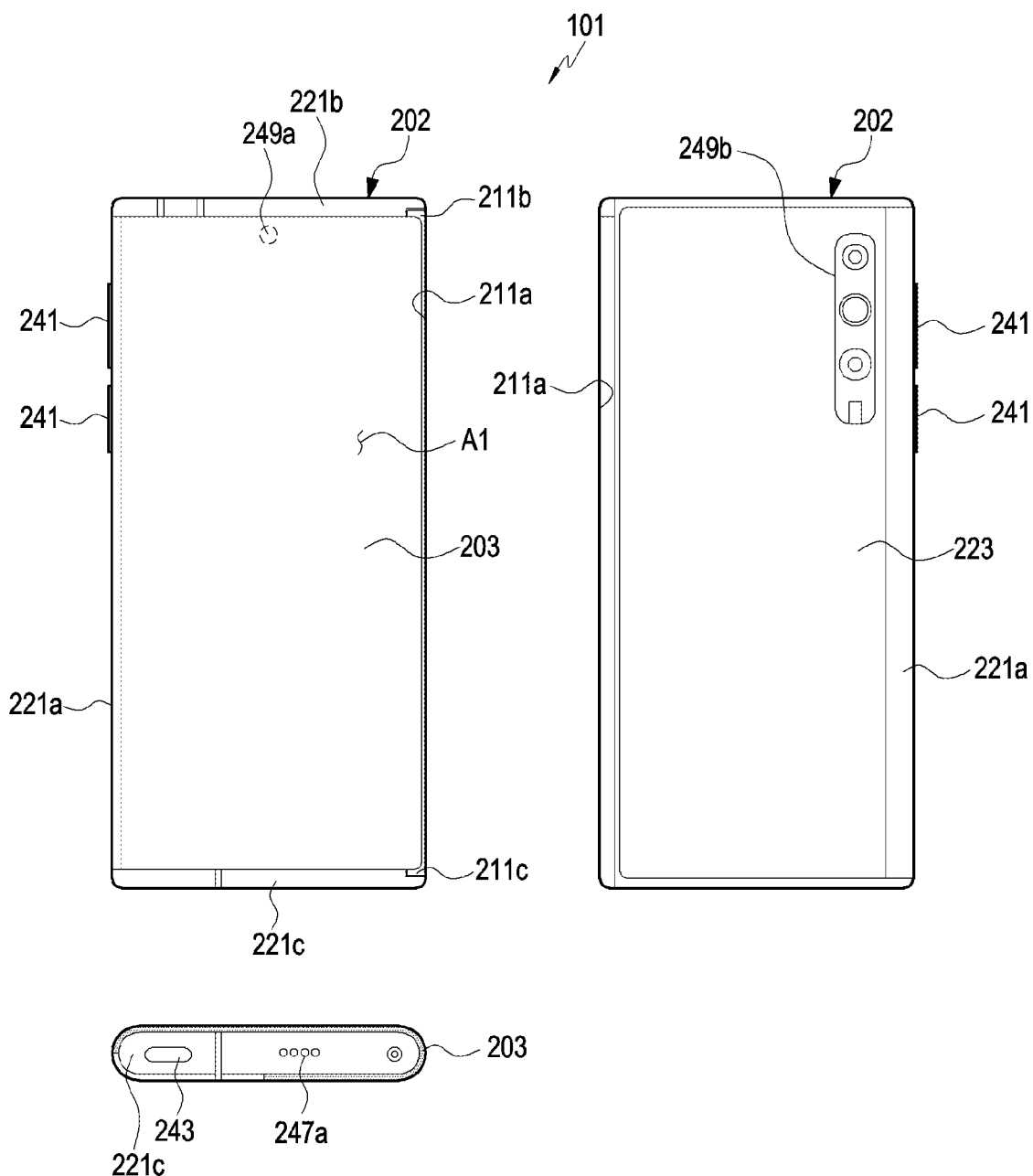
FIG. 2 is a view illustrating an electronic device in a closed state, according to an example embodiment.
Figure 3:
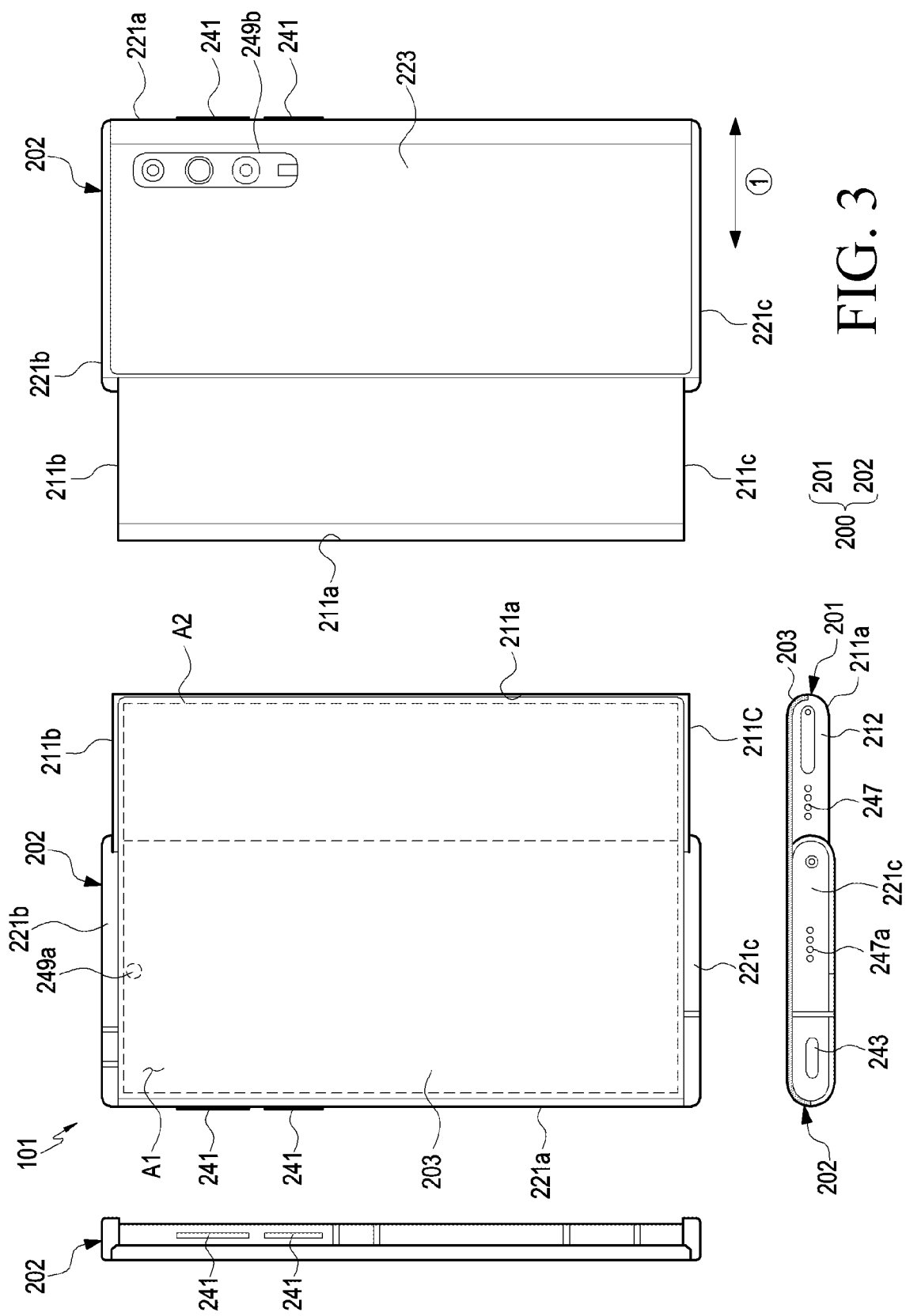
FIG. 3 is a view illustrating an electronic device in an open state, according to various example embodiments.

FIG. 2 is a view illustrating an electronic device in a closed state, according to various example embodiments. FIG. 3 is a view illustrating an electronic device in an open state, according to various example embodiments. For example, FIG. 2 is a view illustrating a state in which a second display area A2 is received in a housing 202. FIG. 3 is a view illustrating a state in which at least a portion of the second display area A2 is visually exposed to the outside of the housing 202.

The state shown in FIG. 2 may be denoted as a first housing 201 being closed with respect to a second housing 202, and the state shown in FIG. 2 may be denoted as the first housing 201 being open with respect to the second housing 202. According to an embodiment, the "closed state" or "opened state" may be defined as a closed or open state of the electronic device.

Referring to FIGS. 2 and 3, the electronic device 101 may include a housing 200. The housing 200 may include a second housing 202 and a first housing 201 that is movable with respect to the second housing 202. According to an embodiment, the electronic device 101 may be interpreted as having a structure in which the second housing 202 is slidably disposed on the first housing 201. According to an embodiment, the first housing 201 may be disposed to perform reciprocating motion by a predetermined distance in a predetermined direction with respect to the second housing 202, for example, a direction indicated by an arrow ①. The configuration of the electronic device 101 of FIGS. 2 and 3 may be identical in whole or part to the configuration of the electronic device 101 of FIG. 1.

According to an embodiment, the first housing 201 may be referred to as, e.g., a first structure, a slide part, or a slide housing, and may be disposed to reciprocate on the second housing 202. According to an embodiment, the second housing 202 may be referred to as, e.g., a second structure, a main part, or a main housing. The second housing 202 may receive at least a portion of the first housing 201 and may guide the slide of the first housing 201. According to an embodiment, the second housing 202 may receive various electrical and electronic components, such as a main circuit board or a battery. According to an embodiment, at least a portion (e.g., the first display area A1) of the display 203 may be visually exposed to the outside of the housing 200. According to an embodiment, another portion (e.g., the second display area A2) of the display 203 may be received into the inside of the second housing 202 (e.g., a slide-in motion) or be visually exposed to the outside of the second housing 202 (e.g., a slide-out motion) as the first housing 201 moves (e.g., slides) with respect to the second housing 202. According to an embodiment, a motor, a speaker, a sim socket, and/or a sub circuit board electrically connected with a main circuit board may be disposed in the first housing 201. A main circuit board on which electrical components, such as an application processor (AP) and a communication processor (CP) are mounted may be disposed in the second housing 202.

Figure 4:
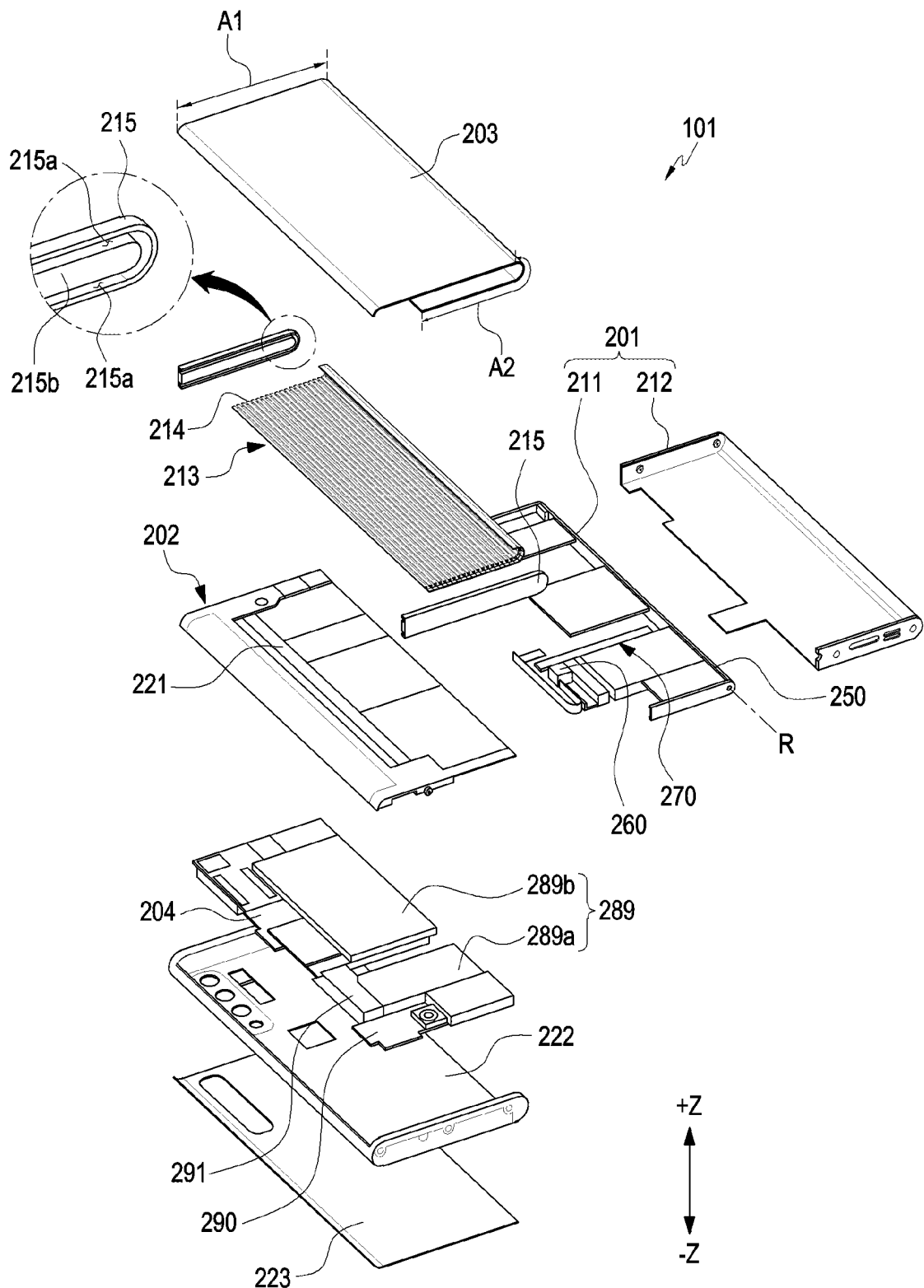
FIG. 4 is an exploded perspective view illustrating an electronic device according to an example embodiment.

According to various embodiments, the first housing 201 may include first sidewalls 211a, 211b, and 211c for surrounding at least a portion of the display 203 and/or the supporting structure (e.g., the supporting structure 213 of FIG. 4). According to an embodiment, the first sidewalls 211a, 211b, and 211c may extend from the first plate 211. The first sidewalls 211a, 211b, and 211c may include a 1-2th sidewall 211b, a 1-3th sidewall 211c opposite to the 1-2th sidewall 211b, and a 1-1th sidewall 211a extending from the 1-2th sidewall 211b to the 1-3th sidewall 211c. The 1-1th sidewall 211a may be substantially perpendicular to the 1-2th sidewall 211b and/or the 1-3th sidewall 211c. According to an embodiment, in the closed state (e.g., FIG. 2) of the electronic device 101, the 1-2th sidewall 211b may face the 2-2th sidewall 221b of the second housing 202, and the 1-3th sidewall 211c may face the 2-3th sidewall 221c of the second housing 202. According to an embodiment, the 1-1th sidewall 211a, the 1-2th sidewall 211b, and/or the 1-3th sidewall 211c may be integrally formed with a first plate (e.g., the first plate 211 or slide cover 212 of FIG. 4). According to another embodiment, the 1-1th sidewall 211a, the 1-2th sidewall 211b, and/or the 1-3th sidewall 211c may be formed as separate housings and be combined or assembled.

According to various embodiments, the second housing 202 may include second sidewalls 221a, 221b, and 221c to surround at least a portion of the first housing 201. According to an embodiment, the second sidewalls 221a, 221b, and 221c may extend from a second plate (e.g., the second plate 221 of FIG. 4) and/or a cover member (e.g., the cover member 222 of FIG. 4). According to an embodiment, the second sidewalls 221a, 221b, and 221c may include a 2-2th sidewall 221b, a 2-3th sidewall 221c opposite to the 2-2th sidewall 221b, and a 2-1th sidewall 221a extending from the 2-2th sidewall 221b to the 2-3th sidewall 221c. According to an embodiment, the 2-1th sidewall 221a may be substantially perpendicular to the 2-2th sidewall 221*b* and/or the 2-3th sidewall 221*c*. According to an embodiment, the 2-2th sidewall 221*b* may face the 1-2th sidewall 211*b*, and the 2-3th sidewall 221*c* may face the 1-3th sidewall 211*c*. For example, in the closed state (e.g., FIG. 2) of the electronic device 101, the 2-2th sidewall 221*b* may cover at least a portion of the 1-2th sidewall 211*b*, and the 2-3th sidewall 221*c* may cover at least a portion of the 1-3th sidewall 211*c*.

According to various embodiments, the second housing 202 may be formed to be open at one side (e.g., a front face) to receive (or surround) at least a portion of the first housing 201. For example, the first housing 201 may be connected, directly or indirectly, to the second housing 202 while being at least partially surrounded by the 2-1th sidewall 221*a*, the 2-2th sidewall 221*b*, and the 2-3th sidewall 221*c* and may be slid in the direction of arrow ① while being guided by the second housing 202. According to an embodiment, the cover member (e.g., the cover member 222 of FIG. 4), the 2-1th sidewall 221*a*, the 2-2th sidewall 221*b*, and/or the 2-3th sidewall 221*c* may be formed integrally. According to another embodiment, the second cover member 222, the 2-1th sidewall 221*a*, the 2-2th sidewall 221*b*, and/or the 2-3th sidewall 221*c* may be formed as separate housings and be combined or assembled.

According to various embodiments, the second housing 202 may include a rear plate 223. According to an embodiment, the rear plate 223 may form at least a portion of the exterior of the electronic device 101. For example, the rear plate 223 may provide a decorative effect on the exterior of the electronic device 101.

According to various embodiments, the cover member 222 and/or the 2-1th sidewall 221*a* may cover at least a portion of the display 203. For example, at least a portion of the display 203 (e.g., the second display area A2) may be received in the second housing 202, and the cover member 222 and/or the 2-1th side wall 221*a* may cover a portion of the display 203 received in the second housing 202.

According to various embodiments, the electronic device 101 may include a display 203. For example, the display 203 may be interpreted as a flexible display or a rollable/slidable display. According to an embodiment, at least a portion of the display 203 (e.g., the second display area A2) may slide based on the slide of the first housing 201. According to an embodiment, the display 203 may include, or be disposed adjacent or proximate to, a touch detection circuit, a pressure sensor capable of measuring the intensity (pressure) of a touch, and/or a digitizer that detects a magnetic field-type stylus pen. The configuration of the display 203 of FIGS. 2 and 3 may be identical in whole or part to the configuration of the display module 160 (comprising a display) of FIG. 1.

According to various embodiments, the display 203 may include a first display area A1 and a second display area A2. According to an embodiment, the first display area A1 may be an area that is always visible from the outside. According to an embodiment, the first display area A1 may be interpreted as an area that cannot be positioned inside the housing 202. According to an embodiment, the first display area A1 may be seated on a portion (e.g., the first plate 211) of the first housing 201. According to an embodiment, the second display area A2 may extend from the first display area A1, and the second display area A2 may be inserted or received in, or visually exposed to the outside of, the second housing 202 as the first housing 201 slides.

According to various embodiments, the second display area A2 may be substantially moved while being guided by the multi-bar structure (e.g., the supporting structure 213 of FIG. 4) mounted in the first housing 201 and may be thus received in, or visually exposed to the outside of, the second housing 202 or a space formed between the first housing 201 and the second housing 202. According to an embodiment, the second display area A2 may be moved based on the slide of the first housing 201 in the width direction (e.g., the direction indicated by the arrow ①). For example, at least a portion of the second display area A2 may be unfolded or rolled/slid together with the supporting structure 213 based on a slide of the first housing 201.

According to various embodiments, when viewed from above the first housing 201, if the first housing 201 moves from the closed state to the open state, the second display area A2 may be gradually exposed to the outside of the housing 202 to be substantially coplanar with the first display area A1. In an embodiment, the second display area A2 may be at least partially received in the first housing 201 and/or the second housing 202.

According to various embodiments, the electronic device 101 may include at least one key input device 241, a connector hole 243, audio modules 247*a* and 247*b*, or camera modules 249*a* and 249*b*. Although not shown, the electronic device 101 may further include an indicator (e.g., a light emitting diode (LED) device) or various sensor modules. The configuration of the audio module 247*a* and 247*b* and camera modules 249*a* and 249*b* of FIGS. 2 and 3 may be identical in whole or part to the configuration of the audio module 170 and the camera module 180 of FIG. 1. Each "module" herein may comprise circuitry.

According to various embodiments, the key input device 241 may be positioned in one area of the first housing 201. Depending on the appearance and the state of use, the electronic device 101 may be designed to omit the illustrated key input device 241 or to include additional key input device(s). According to an embodiment, the electronic device 101 may include a key input device (not shown), e.g., a home key button or a touchpad disposed around the home key button. According to another embodiment (not shown), at least a portion of the key input device 241 may be disposed on the second housing 202.

According to various embodiments, the key input device 241 may be used as a driving structure for automatically or semi-automatically providing a slide in-out operation of the display 203. For example, when the user presses an open trigger button (e.g., the key input device 241 of FIG. 2) exposed outside the electronic device 101, the display 203 may automatically slide in or out (automatic operation). As another example, when the user slides out the display 203 by pushing the display 203 of the electronic device 101 up to a designated section, for the remaining section, it may be completely slid out by the force of an elastic member (not shown) and/or a driving body (not shown) mounted in the electronic device 101 (semi-automatic operation). For example, the electronic device 101 may slide out in the closed state (e.g., FIG. 2) and switch to the opened state (e.g., FIG. 3). The slide-in motion of the electronic device 101 may also be performed to correspond to the slide-out motion.

According to various embodiments, the connector hole 243 may be omitted or may receive a connector (e.g., a universal serial bus (USB) connector) for transmitting and receiving power and/or data with an external electronic device. Although not shown, the electronic device 101 may include a plurality of connector holes 243, and some of the plurality of connector holes 243 may function as connector holes for transmitting/receiving audio signals with an external electronic device. In the illustrated embodiment, the connector hole 243 is disposed in the 2-3th sidewall 221*c*, but the scope is not limited thereto. The connector hole 243 or a connector hole not shown may be disposed in the 2-1th sidewall 221a or the 2-2th sidewall 221b.

According to various embodiments, the audio modules 247a and 247b may include at least one speaker hole or at least one microphone hole. At least one of the speaker holes may be provided as an external speaker hole. At least one of the speaker holes may be provided as a receiver hole for voice call. The electronic device 101 may include a microphone for obtaining sound. The microphone may obtain external sound of the electronic device 101 through the microphone hole. According to an embodiment, the electronic device 101 may include a plurality of microphones to detect the direction of sound. According to an embodiment, the electronic device 101 may include an audio module in which the speaker holes and/or the microphone hole are implemented as one hole or may include a speaker without the speaker hole (e.g., a piezo speaker).

According to various embodiments, the camera modules 249a and 249b may include a first camera module 249a and/or a second camera module 249b. The second camera module 249b may be positioned in the second housing 202 and may capture a subject in a direction opposite to the first display area A1 of the display 203. The electronic device 101 may include a plurality of camera modules 249a and 249b. For example, the electronic device 101 may include at least one of a wide-angle camera, a telephoto camera, or a close-up camera. According to an embodiment, the electronic device 101 may measure the distance to the subject by including an infrared projector and/or an infrared receiver. The camera modules 249a and 249b may include one or more lenses, an image sensor, and/or an image signal processor. The electronic device 101 may further include another camera module (first camera module 249a, e.g., a front camera) that captures a subject in a direction opposite to the second camera module 249b. For example, the first camera module 249a may be disposed around the first display area A1 or in an area overlapping the first display area A1. If disposed in an area overlapping the display 203, the first camera module 249a may capture the subject through the display 203.

According to various embodiments, an indicator (e.g., an LED device) of the electronic device 101 may be disposed on the first housing 201 and/or the second housing 202, and the indicator may include a light emitting diode to provide state information about the electronic device 101 as a visual signal. The sensor module (e.g., the sensor module 176 of FIG. 1) of the electronic device 101 may produce an electrical signal or data value corresponding to the internal operation state or external environment state of the electronic device. The sensor module (comprising at least one sensor) may include, for example, a proximity sensor, a fingerprint sensor, or a biometric sensor (e.g., an iris/face recognition sensor or a heartrate monitor (HRM) sensor). In another embodiment, the electronic device 101 may include at least one of a gesture sensor, a gyro sensor, an atmospheric pressure sensor, a magnetic sensor, an accelerometer, a grip sensor, a color sensor, an infrared (IR) sensor, a temperature sensor, a humidity sensor, or an illuminance sensor. The configuration of the display 203, audio module 247a and 247b, and camera module 249a and 249b of FIG. 2 may be identical in whole or part to the configuration of the display module 160, the audio module 170, and the camera module 180 of FIG. 1.

Each embodiment herein may be used in combination with any other embodiment described herein.

FIG. 4 is an exploded perspective view illustrating an electronic device according to one of various example embodiments.

Referring to FIG. 4, an electronic device 101 may include a first housing 201, a second housing 202, a display 203, and a supporting structure 213. A portion (e.g., the second display area A2) of the display 203 may be received in the electronic device 101 while being guided by the supporting structure 213. The configuration of the first housing 201, the second housing 202, and the display 203 of FIG. 4 may be identical in whole or part to the configuration of the first housing 201, the second housing 202, and the display 203 of FIGS. 2 and/or 3.

According to various embodiments, the first housing 201 may include a first plate 211 and a slide cover 212. The first plate 211 and the slide cover 212 may linearly reciprocate in one direction (e.g., the direction of arrow ① in FIG. 3) while being guided by the second housing 202. According to an embodiment, the first plate 211, along with the slide cover 212, may slide with respect to the second housing 202. For example, at least a portion of the display 203 and/or at least a portion of the supporting structure 213 may be disposed between the first plate 211 and the slide cover 212.

According to an embodiment, the first plate 211 may support at least a portion of the display 203 (e.g., the second display area A2). For example, the first plate 211 may include a curved surface 250. At least a portion of the second display area A2 of the display 203 may be positioned on the curved surface 250. According to an embodiment, the first plate 211 may be interpreted as a display support bar (DSB) and/or a display support plate (DSP).

According to an embodiment, the slide cover 212 may protect the display 203 positioned on the first plate 211. For example, the slide cover 212 may surround at least a portion of the display 203. At least a portion of the display 203 may be positioned between the first plate 211 and the slide cover 212. According to an embodiment, the first plate 211 and the slide cover 212 may be formed of a metal material and/or a non-metal (e.g., polymer) material.

According to various embodiments, the first housing 201 may include a guide rail 215. According to an embodiment, the guide rail 215 may be connected, directly or indirectly, to the first plate 211 and/or the slide cover 212. For example, the guide rail 215, along with the first plate 211 and the second slide cover 212, may slide with respect to the second housing 202.

According to various embodiments, the electronic device 101 may include a supporting structure 213. According to an embodiment, the supporting structure 213 may support the display 203. For example, the supporting structure 213 may be connected with the display 203.

According to an embodiment, at least a portion of the display 203 and the supporting structure 213 may be positioned between the first plate 211 and the slide cover 212. According to an embodiment, as the first housing 201 slides, the supporting structure 213 may move with respect to the second housing 202. In the closed state (e.g., FIG. 2) of the supporting structure 213, most of the structure may be received in the second housing 202. According to an embodiment, at least a portion of the supporting structure 213 may move corresponding to the curved surface 250 positioned at the edge of the first plate 211.

According to various embodiments, the supporting structure 213 may include a plurality of bars 214 (or rods). For example, the supporting structure 213 may be referred to as a multi-bar structure. The plurality of rods 214 may extend in a straight line and be disposed parallel to the rotational axis R formed by the curved surface 250, and the plurality of rods 214 may be arranged along a direction perpendicular to the rotational axis R (e.g., the direction along which the first housing 201 slides).

According to various embodiments, each rod 214 may pivot around another adjacent or proximate rod 214 while remaining parallel with the other adjacent rod 214. According to an embodiment, as the first housing 201 slides, the plurality of rods 214 may be arranged to form a curved shape or may be arranged to form a planar shape. For example, as the first housing 201 slides, a portion of the supporting structure 213 facing the curved surface 250 may form a curved surface, and another portion of the supporting structure 213 that does not face the curved surface 250 may form a flat surface. According to an embodiment, the second display area A2 of the display 203 may be mounted or supported on the supporting structure 213, and in the open state (e.g., FIG. 3), at least a portion of the second display area A2, along with the first display area A1, may be exposed to the outside of the second housing 202. In the state in which the second display area A2 is exposed to the outside of the second housing 202, the supporting structure 213 may substantially form a flat surface, thereby supporting or maintaining the second display area A2 in the flat state. According to an embodiment, the supporting structure 213 may be replaced with a bendable integral supporting member (not shown). According to an embodiment, the supporting structure 213 may be interpreted as a display supporting multi-bar or articulated hinge structure.

According to various embodiments, the guide rail 215 may guide the movement of the plurality of rods 214. According to an embodiment, the guide rail 215 may include an upper guide rail adjacent or proximate to the 1-2th sidewall (e.g., the 1-2th sidewall 211b in FIG. 3) and a lower guide rail adjacent or proximate to the 1-3th sidewall (e.g., the 1-3th sidewall 211c). According to an embodiment, the guide rail 215 may include a groove-shaped rail 215a formed inside the guide rail 215 and a protrusion 215b positioned inside the guide rail. At least a portion of the protrusion 215b may be surrounded by the rail 215a. According to an embodiment, the supporting structure 213 may be positioned between the upper guide rail and the lower guide rail and may move while remaining engaged with the upper and lower guide rails. For example, upper and/or lower portions of the plurality of rods 214 may slide along the rail 215a while fitted into the rail 215a.

According to an embodiment, when the electronic device 101 is opened (e.g., a slide-out motion), the size of the area where the display 203 is exposed to the outside may be increased. For example, by the driving force of the motor structure 260 and/or by an external force provided by the user, the first plate 211 connected, directly or indirectly, with the motor structure 260 may be slid out, and the protrusion 215b inside the guide rail 215 may push out the upper and/or lower ends of the plurality of rods 214. Accordingly, the display 203 received between the first plate 211 and the slide cover 212 may be extended.

According to an embodiment, when the electronic device 101 is closed (e.g., a slide-in motion), the size of the area where the display 203 is exposed to the outside may be reduced. For example, by driving the motor structure 260 (e.g., driving for sliding in the display) and/or by an external force provided by the user, the first plate 211 where the motor is disposed may be slid in, and the outer portion (e.g., a portion other than the protrusion 215b) of the guide rail 215 may push out the upper and/or lower ends of the plurality of rods 214. Accordingly, the extended display 203 may be received between the first plate 211 and the slide cover 212.

According to various embodiments, the second housing 202 may include a second plate 221, a cover member 222, and a rear plate 223. According to an embodiment, the second plate 221 may support at least a portion (e.g., the first display area A1) of the display 203. The second plate 221 may be disposed between the display 203 and the circuit board 204. According to an embodiment, the cover member 222 may receive components (e.g., the battery 289 (e.g., the battery 189 of FIG. 1) and the circuit board 204) of the electronic device 101 and may protect the components of the electronic device 101. According to an embodiment, the cover member 222 may be referred to as a book cover.

According to various embodiments, a plurality of circuit boards may be received in the second housing 202. A processor, memory, and/or interface may be mounted on the circuit board 204 which is the main board. The processor may include one or more of, e.g., a central processing unit, an application processor, a graphic processing device, an image signal processing, a sensor hub processor, or a communication processor. According to various embodiments, the circuit board 204 may include a flexible printed circuit board type radio frequency cable (FRC). For example, the circuit board 204 may be disposed in the cover member 222 and may be electrically connected with an antenna module (e.g., the antenna module 197, including at least one antenna, of FIG. 1) and a communication module (e.g., the communication module 190, including communication circuitry, of FIG. 1).

According to an embodiment, the memory may include, e.g., a volatile or non-volatile memory.

According to an embodiment, the interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to various embodiments, the electronic device 101 may further include a separate sub circuit board 290 spaced apart from the circuit board 204 in the second housing 202. The sub circuit board 290 may be electrically connected with the circuit board 204 through the flexible circuit board 291. The sub circuit board 290 may be electrically connected, directly or indirectly, with electrical components disposed in an end of the electronic device 101, such as the battery 289 or a speaker and/or a sim socket, and may transfer signals and power.

According to an embodiment, the battery 289 may be a device for supplying power to at least one component of the electronic device 101. The battery 189 may include, e.g., a primary cell which is not rechargeable, a secondary cell which is rechargeable, or a fuel cell. At least a portion of the battery 289 may be disposed on substantially the same plane as the circuit board 204. The battery 289 may be integrally or detachably disposed inside the electronic device 101.

According to various embodiments, the battery 289 may be formed as a single embedded battery or may include a plurality of removable batteries (e.g., the first battery 289a and the second battery 289b). According to an embodiment, when the embedded battery is positioned on the first plate 211, the embedded battery may move as the first plate 211 slides. According to an embodiment, when the embedded battery is positioned on the second plate 221, the embedded battery may be fixedly disposed on the second plate 221, regardless of the slide of the first plate 211. As another example, when the first battery 289*a* of the removable batteries is positioned on the first plate 211, and the second battery 289*b* of the removable batteries is fixedly positioned on the second plate 221, only the first battery 289*a* may move as the first plate 211 slides.

According to various embodiments, the rear plate 223 may substantially form at least a portion of the exterior of the second housing 202 or the electronic device 101. For example, the rear plate 223 may be coupled, directly or indirectly, to the outer surface of the cover member 222. According to an embodiment, the rear plate 223 may be integrally formed with the cover member 222. According to an embodiment, the rear plate 223 may provide a decorative effect on the exterior of the electronic device 101. The second plate 221 and the cover member 222 may be formed of at least one of a metal or a polymer, and the rear plate 223 may be formed of at least one of metal, glass, synthetic resin or ceramic. According to an embodiment, the second plate 221, the cover member 222 and/or the rear plate 223 may be formed of a material that transmits light at least partially (e.g., the auxiliary display area). For example, in a state in which a portion of the display 203 (e.g., the second display area A2) is received in the electronic device 101, the electronic device 101 may output visual information using the second display area A2. The auxiliary display area may be a portion of the second plate 221, the cover member 222, and/or the rear plate 223 in which the display 203 received in the second housing 202 is positioned.

According to an embodiment, the electronic device 101 may include the motor structure 260 for generating power for sliding the electronic device 101. According to an embodiment, the motor structure 260 may be connected, directly or indirectly, to at least a portion (e.g., the first plate 211) of the first housing 201 and, together with the first housing 201, be slid with respect to the second housing 202.

According to an embodiment, the electronic device 101 may include a gear assembly 270 for transferring at least a portion of the power transferred from the motor structure 260. For example, the gear assembly 270 may transfer a driving force for a slide-in and/or slide-out motion of the electronic device 101 to the first housing 201 and/or the second housing 202. Each "gear assembly" herein includes at least one gear.

According to various embodiments, the electronic device 101 may automatically or semi-automatically provide the slide in/out operation of the display 203 using the motor structure 260 and/or the gear assembly 270. For example, when the user presses an open trigger button (e.g., the key input device 241 of FIG. 2) exposed outside the electronic device 101, the display 203 may automatically slide in or out (automatic operation). As another example, when the user slides out the display 203 by pushing the display 203 of the electronic device 101 up to a designated section, for the remaining section, it may be completely slid out by the force of an elastic member (not shown) and/or an actuator (not shown) mounted in the electronic device 101 (semi-automatic operation).

The electronic device 101 disclosed in FIGS. 2 to 4 has a rollable and/or slidable appearance but the scope is not limited thereto. According to an embodiment (not shown), at least a portion of the illustrated electronic device may be rolled up in a scroll shape.

Referring to FIGS. 2 to 4, when viewed from the front of the electronic device 101, the display 203 may extend to the right of the electronic device 101. However, the structure of the electronic device 101 is not limited thereto. For example, according to an embodiment, the display 203 may extend to the left of the electronic device 101. According to another embodiment, the display 203 may extend in the length direction of the electronic device 101.

Figure 5:
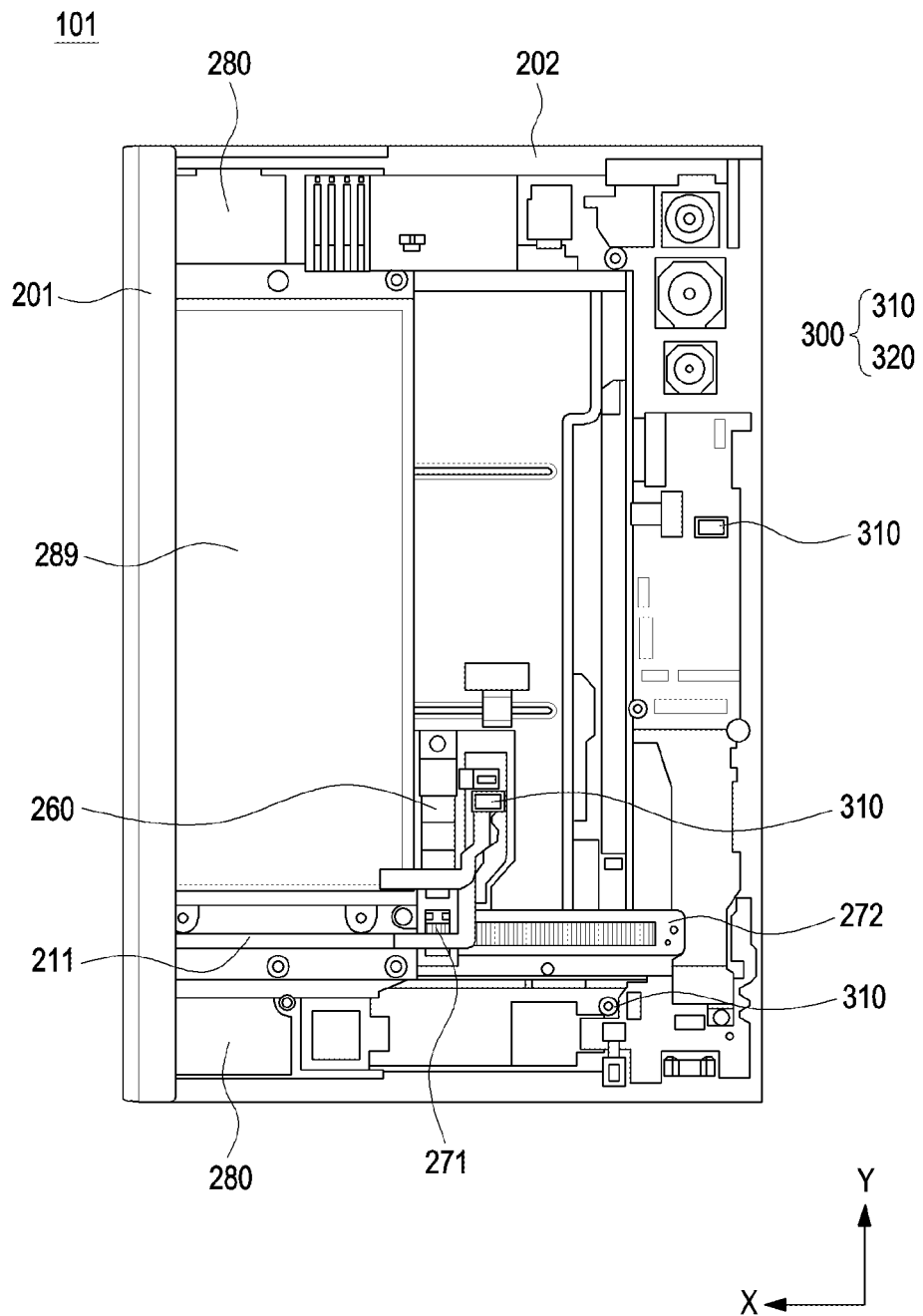
FIG. 5 is a rear view illustrating an electronic device without a display according to an example embodiment.
Figure 6:
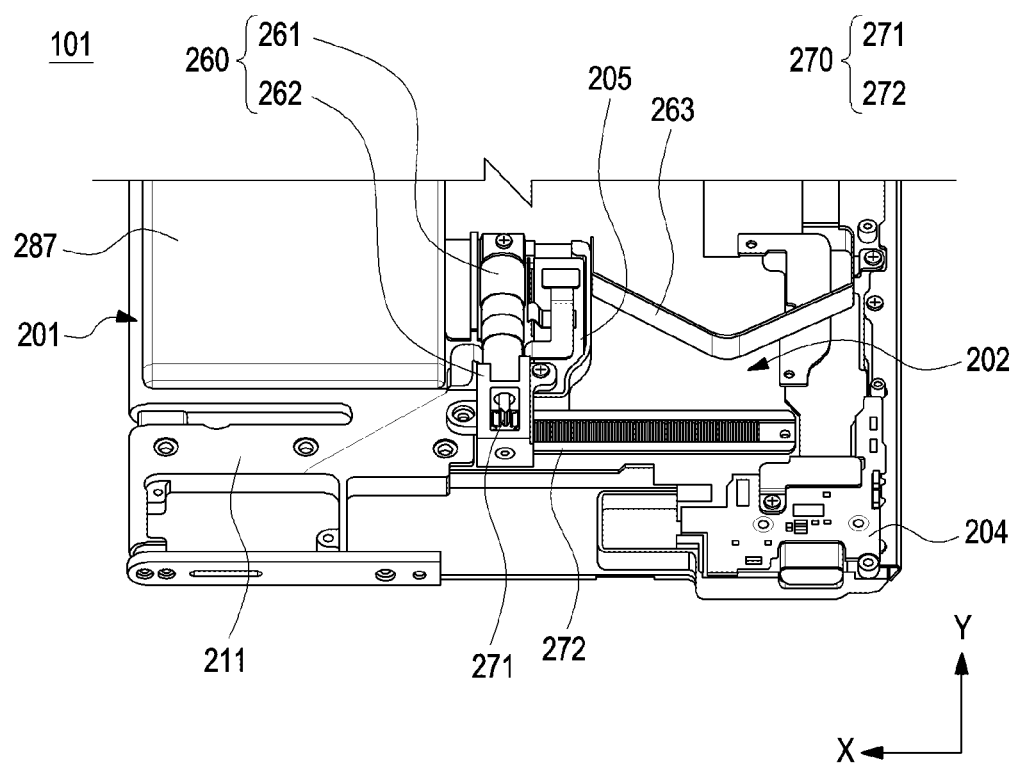
FIG. 6 is a perspective view illustrating an electronic device without a display according to an example embodiment.

FIG. 5 is a rear view illustrating an electronic device without a display according to an example embodiment. FIG. 6 is a perspective view illustrating an electronic device without a display according to an example embodiment.

Referring to FIG. 5 and/or 6, the electronic device 101 may include a first housing 201, a second housing 202, a first plate 211, a battery 289, a motor structure 260, and a gear assembly 270. The configuration of the first housing 201, the second housing 202, the first plate 211, the battery 289, the motor structure 260, and the gear assembly 270 of FIG. 5 and/or 6 may be identical in whole or part to the configuration of the first housing 201, the second housing 202, the first plate 211, the battery 289, the motor structure 260, and the gear assembly 270 of FIG. 4.

According to an embodiment, the motor structure 260 may be disposed on a circuit board (e.g., the circuit board 204 of FIG. 4) and be controlled by a processor (e.g., the processor 120 of FIG. 1). For example, the processor 120 may include a motor driver driving circuit and provide a pulse width modulation (PWM) signal for controlling the speed of the motor structure 260 and/or the torque of the motor structure 260 to the motor structure 260.

According to an embodiment, the motor structure 260 may be disposed in the first housing 201. For example, the motor structure 260 may be connected (directly or indirectly) to the first plate 211 and the first housing 201. According to an embodiment, the motor structure 260 may be connected (directly or indirectly) to a portion (e.g., a first gear 271) of the gear assembly 270 and transfer a driving force to the first gear 271. According to an embodiment, the motor structure 260 may include a motor core 261 for converting electrical energy into mechanical energy (e.g., rotation). According to an embodiment, the motor structure 260 may include a motor bracket 262 surrounding at least a portion of the first gear 271. According to an embodiment, at least a portion of the motor structure 260 may be disposed on an auxiliary printed circuit board 205 electrically connected to the printed circuit board 204.

According to an embodiment, the gear assembly 270 may guide the slide of the first housing 201 and/or the second housing 202. According to an embodiment, the gear assembly 270 may include a first gear 271 and a second gear 272 configured to mesh with the first gear 271. According to an embodiment, the first gear 271 may be referred to as a pinion gear. The second gear 272 may be referred to as a rack gear. According to an embodiment, the second gear 272 may move in the slide direction (e.g., the X-axis direction) of the electronic device 101 by the output of the motor structure 260 transferred through the first gear 271.

According to an embodiment, the second gear 272 may be connected (directly or indirectly) to the housing different from that of the motor structure 260. Referring to FIG. 5, the motor structure 260 may be connected to the first housing 201. The second gear 272 may be connected to a portion (e.g., the second plate 221 and/or the cover member 222) of the second housing 202. Referring to another example (not shown), the motor structure 260 may be connected to the second housing 202. The second gear 272 may be connected to the first housing 201.

Although the gear assembly 270 is illustrated as a rack and a pinion in FIGS. 5 and/or 6, the structure of the gear assembly 270 is not limited thereto. For example, the gear assembly 270 may include a lead screw-type gear.

According to an embodiment, the electronic device 101 may include at least one speaker module 280. The configuration of the speaker module 280 may be identical in whole or part to the configuration of an audio module (e.g., the audio module 170 of FIG. 1). According to an embodiment, the speaker module 280 may be disposed in the first housing 201.

According to various embodiments, the electronic device 101 may include a sensor module 300 (e.g., the sensor module 176 of FIG. 1) for detecting the state of the electronic device 101 and/or an external environment.

According to an embodiment, the sensor module 300 may include a first sensor 310 configured to detect the posture of the electronic device 101. The first sensor 310 may be referred to as a posture detection sensor or a 6-axis sensor.

According to an embodiment, the first sensor 310 may include an accelerometer. The accelerometer may be a mechanical accelerometer and/or a capacitive accelerometer. The mechanical accelerometer may detect the resistance changed based on a change in the position of the weight. The capacitive accelerometer may detect the capacitance of the moving electrode with respect to the fixed electrode.

According to an embodiment, the first sensor 310 may detect the moving direction of the electronic device 101 and an angular velocity of the electronic device 101. For example, the first sensor 310 may detect the degree of freedom (DOF) of the electronic device 101.

According to an embodiment, the first sensor 310 may include a gyro sensor. The gyro sensor may include a micro electro mechanical systems (MEMS) gyro sensor using the Coriolis effect and/or an optical gyro sensor using the Sagnac effect.

According to an embodiment, the first sensor 310 is connected to the structure where the motor structure 260 is disposed and, together with the motor structure 260, may slide. For example, the motor structure 260 may be disposed in the first housing 201, and the first sensor 310 may be disposed on the auxiliary printed circuit board 205 connected to the motor structure 260. As another example, the motor structure 260 may be disposed in the first housing 201, and the first sensor 310 may be disposed on the first plate 211.

According to an embodiment, the motor structure 260 may slide with respect to the second housing 202 while being electrically connected (directly or indirectly) to the circuit board 204 by the flexible circuit board. According to another embodiment (not shown), the motor structure 260 may be connected (directly or indirectly) to the second housing 202. The second gear 272 may be connected (directly or indirectly) to the first housing 201.

According to an embodiment, the sensor module 300 may include a second sensor 320 configured to detect a slide distance of the electronic device 101. The second sensor 320 may be referred to as a distance detection sensor.

According to an embodiment, the processor 120 may determine the distance between the first housing 201 and the second housing 202 using the second sensor 320. According to an embodiment, the second sensor 320 may include at least one of a magnetic force sensor (e.g., a Hall sensor), a capacitive sensor, an optical sensor (e.g., a TOF sensor, a dot code detection sensor or an optical encoder), an electromagnetic resonance-type sensor, a resistance-type sensor, or an antenna. According to an embodiment, the processor 120 may determine the moving speed of the first housing 201 with respect to the second housing 202 by the second sensor 320. Each "processor" herein comprises processing circuitry.

Figure 7A:
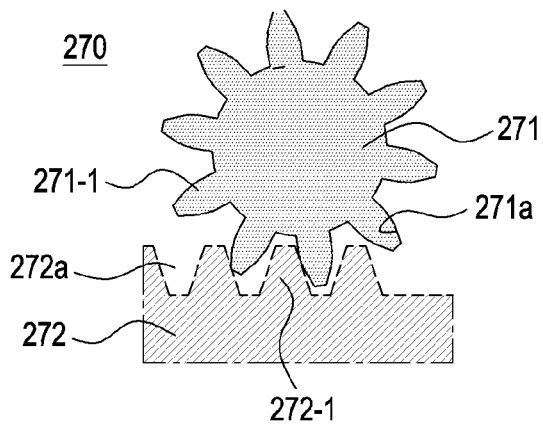
FIGS. 7A to 7E are views illustrating a gear assembly according to an example embodiment.
Figure 7B:
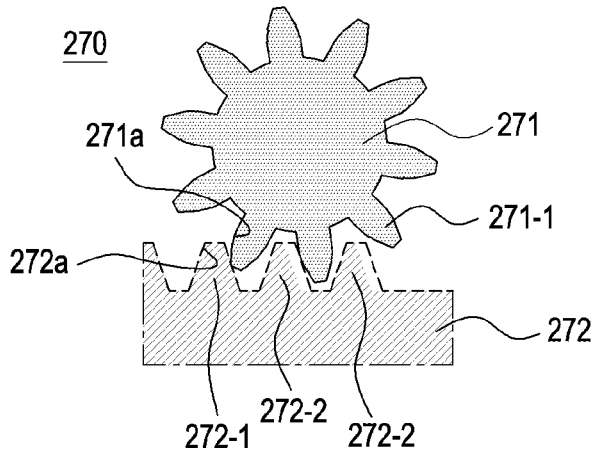
Figure 7C:
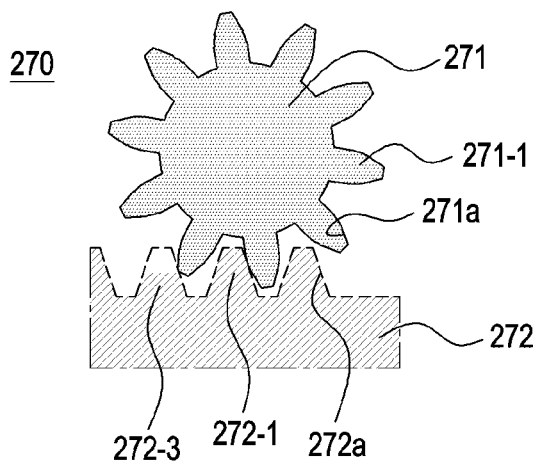
Figure 7D:
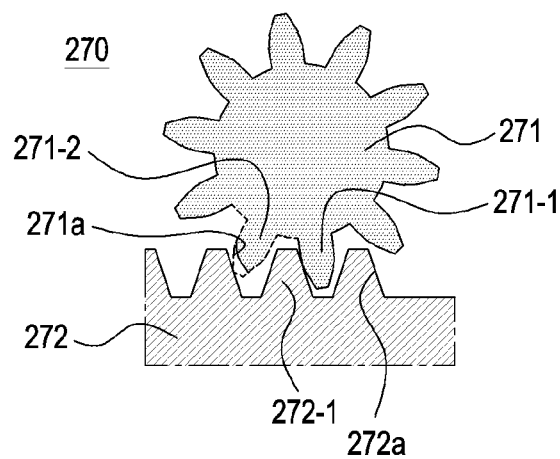
Figure 7E:
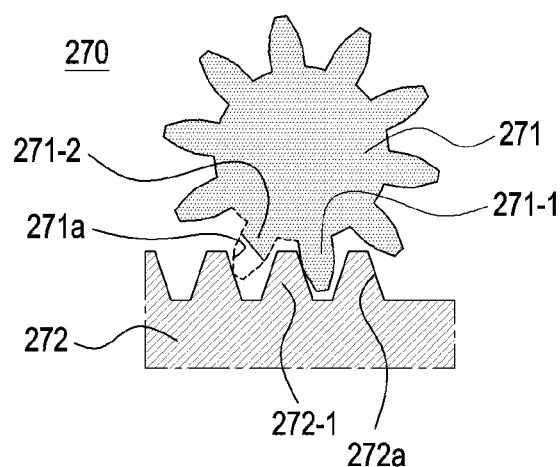

FIGS. 7A to 7E are views illustrating a gear assembly according to an example embodiment. For example, FIG. 7A is a view schematically illustrating a gear assembly in a normal state according to an example embodiment. FIG. 7B is a view schematically illustrating a second gear which has been worn according to an example embodiment. FIG. 7C is a view schematically illustrating a gear assembly which has been damaged according to an example embodiment. FIG. 7D is a view illustrating a first gear which has been worn according to an example embodiment. FIG. 7E is a view illustrating a first gear which has been damaged according to an example embodiment.

Referring to FIGS. 7A to 7E, the gear assembly 270 may include a first gear 271 and a second gear 272 configured to mesh with the first gear 271. The configuration of the first gear 271 and the second gear 272 of FIGS. 7A to 7E may be identical in whole or part to the configuration of the first gear 271 and the second gear 272 of FIG. 5 and/or 6.

According to an embodiment, the second gear 272 may be slid based on the rotation of the first gear 271. For example, the first gear 271 may include first gear teeth 271-1, 271-2, and 271-3 forming at least a portion of a first outer surface 271a. The second gear 272 may include second gear teeth 272-1, 272-2, and 272-3 forming at least a portion of a second outer surface 272a. According to an embodiment, the first gear teeth 271-1, 271-2, and 271-3 may mesh with the second gear teeth 272-1, 272-2, and 272-3, and the first gear 271 may move with respect to the second gear 272. The gear teeth may be referred to as gear saw teeth.

According to an embodiment, the processor 120 (including processing circuitry) of FIG. 1 may detect a movement or operation according to contact between the first gear teeth 271-1, 271-2, and 271-3 and the second gear teeth 272-1, 272-2, and 272-3, using the sensor module 300 of FIG. 5.

According to an embodiment, at least a portion of the first gear 271 and/or at least a portion of the second gear 272 may be deformed due to a slide-out and/or slide-in motion of the electronic device (e.g., the electronic device 101 of FIG. 3).

Referring to FIG. 7B and/or 7C, at least a portion of the second gear 272 may be worn or damaged. According to an embodiment, the second gear 272 may include a 2-1th gear tooth 272-1 in a normal state, a 2-2th gear tooth 272-2 which is the 2-1th gear tooth 272-1 at least partially worn, and/or a 2-3th gear tooth 272-3 which is the 2-1th gear tooth 272-1 at least partially damaged. For example, the 2-1th gear tooth 272-1 may be larger in volume than the 2-2th gear tooth 272-2, and the 2-2th gear tooth 272-2 may be larger in volume than the 2-3th gear tooth 272-3.

Referring to FIG. 7D and/or 7E, at least a portion of the first gear 271 may be worn or damaged. According to an embodiment, the first gear 271 may include a 1-1th gear tooth 271-1 in a normal state, a 1-2th gear tooth 271-2 which is the 1-1th gear tooth 271-1 at least partially worn, and/or a 1-3th gear tooth 271-3 which is the 1-1th gear tooth 271-1 at least partially damaged. For example, the 1-1th gear tooth 271-1 may be larger in volume than the 1-2th gear tooth 271-2, and the 1-2th gear tooth 271-2 may be larger in volume than the 1-3th gear tooth 271-3.

Figure 8:
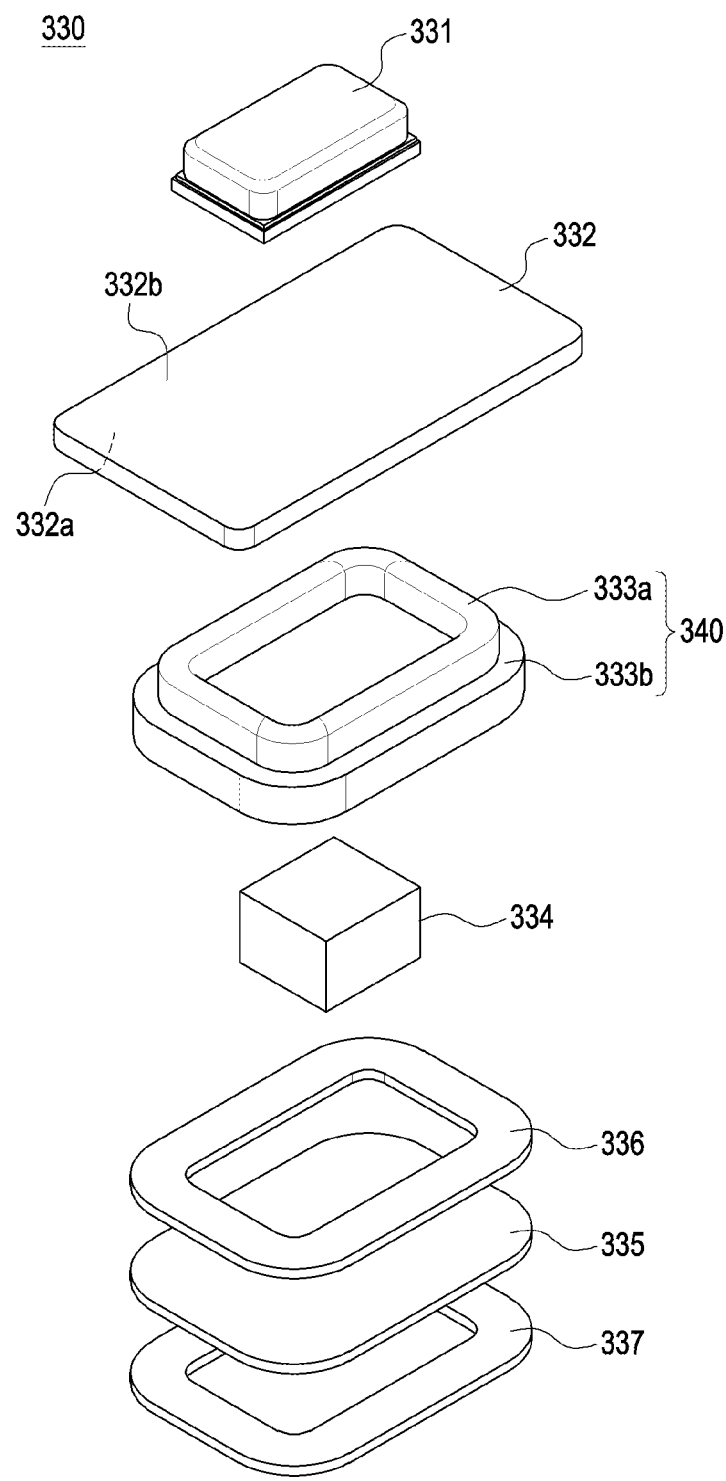
FIG. 8 is an exploded perspective view illustrating a third sensor according to an example embodiment.
Figure 9:
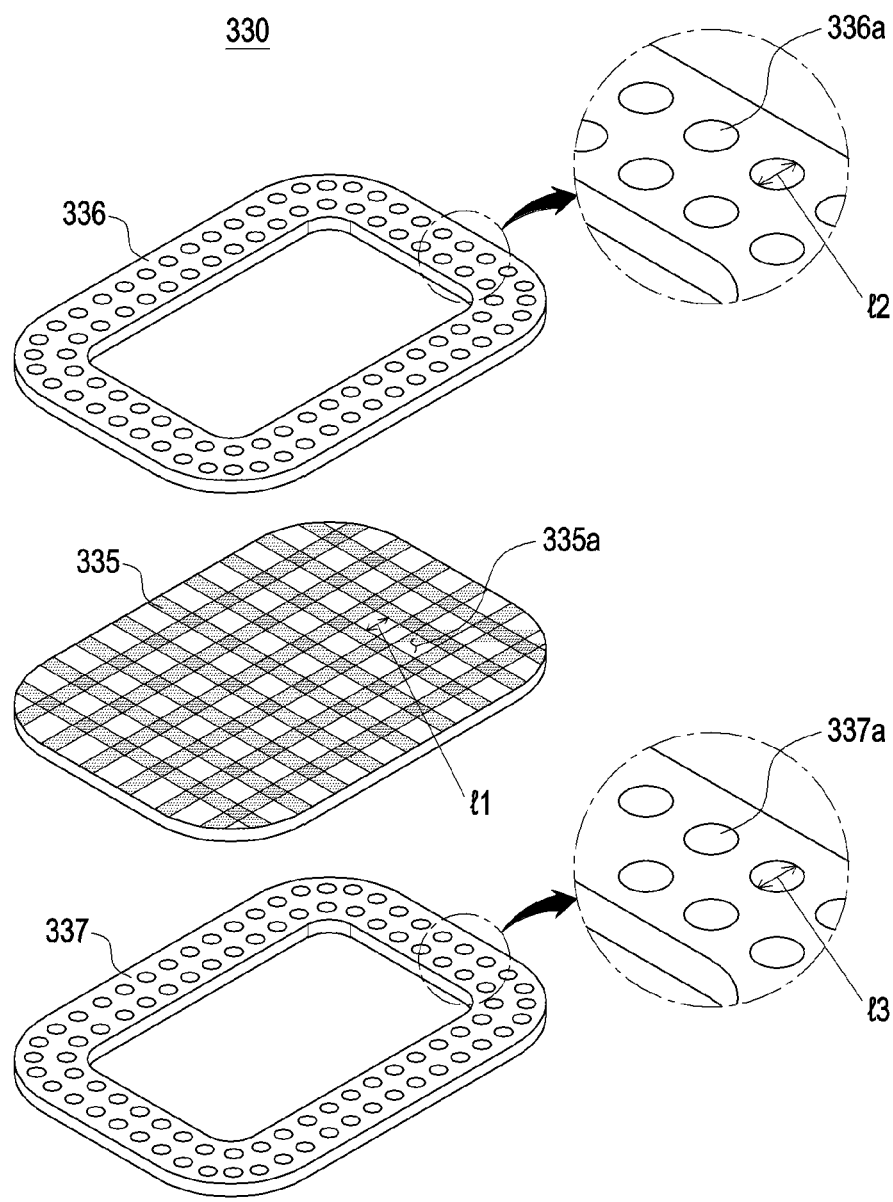
FIG. 9 is an exploded perspective view illustrating the waterproofing member, the first adhesive member, and the second adhesive member of FIG. 8.

FIG. 8 is an exploded perspective view illustrating a third sensor according to an example embodiment. FIG. 9 is an exploded perspective view illustrating the waterproofing member, the first adhesive member, and the second adhesive member of FIG. 8.

Referring to FIG. 8 and/or 9, the electronic device (e.g., the electronic device 101 of FIG. 2) may include a third sensor 330. The configuration of the third sensor 330 may be identical in whole or part to the configuration of the sensor module 300 of FIG. 5.

According to an embodiment, the third sensor 330 may include a microphone module 331, a substrate 332, a shielding member 333, a vibration detection sensor 334, and/or a waterproofing member 335.

According to an embodiment, the third sensor 330 may detect the noise generated when the electronic device 101 is driven, by using the microphone module 331. For example, the third sensor 330 may detect the mechanical noise due to friction caused when the first housing (e.g., the first housing 201 of FIG. 3) and/or second housing (e.g., the second housing 202 of FIG. 3) of the electronic device 101 is moved and/or the noise caused from the coil of the motor structure (e.g., the motor structure 260 of FIG. 5).

According to an embodiment, the microphone module 331 may receive at least one of driving noise and vibration of the electronic device 101 or noise of the surrounding environment. For example, the microphone module 331 may sense vibration transferred through an air medium and/or vibration transferred through a solid medium (e.g., the second housing 202 of FIG. 5). According to an embodiment, the microphone module 331 may be disposed on the substrate 332. For example, the microphone module 331 may be disposed on the first substrate surface 332a or the second substrate surface 332b of the substrate 332.

According to an embodiment, the substrate 332 of the third sensor 330 may be disposed on a first plate (e.g., the first plate 211 of FIG. 5). According to an embodiment, the board 332 may be interpreted as an auxiliary printed circuit board (e.g., the auxiliary printed circuit board 205 of FIG. 6). According to an embodiment, the substrate 332 may be disposed adjacent or proximate to the motor structure 260 of FIG. 5. According to an embodiment, the substrate 332 may be a main circuit board (e.g., the main circuit board 262 of FIG. 4) of the electronic device 101. According to an embodiment, the substrate 332 may include a first substrate surface 332a and a second substrate surface 332b facing in a direction opposite to the first substrate surface 332a. According to an embodiment, the substrate 332 may include a microphone hole connected to the microphone module 331. The microphone hole may provide a sound path for transferring the sound or vibration outside the electronic device 101 to the microphone module 331.

According to various embodiments, the vibration detection sensor 334 may detect vibration due to the driving of the electronic device 101. The configuration of the vibration detection sensor 334 may be identical in whole or part to the configuration of the first sensor 310 of FIG. 5. According to an embodiment, for example, the vibration detection sensor 334 may detect vibration transferred through a solid medium (e.g., the second housing 202 of FIG. 5) of the electronic device 101. According to an embodiment, the vibration detection sensor 334 may be a micro electron mechanical system (MEMS) sensor. For example, the vibration detection sensor 334 may include at least one fixed electrode (not shown) and at least one movable electrode (not shown). The vibration detection sensor 330 may measure acceleration based on the capacitance of the electrode generated when the positional relationship between the fixed electrode and the movable electrode is changed by an external force or the movement of the electronic device 101. According to an embodiment, the vibration detection sensor 334 may be a piezoelectric sensor or a piezoelectric resistance-type accelerometer. According to an embodiment, the vibration detection sensor 334 may be disposed on the substrate 332.

According to various embodiments, the shielding member 333 may reduce irregular vibration transferred to the third sensor 330. According to an embodiment, the shielding member 333 may be formed of a material having elasticity and may absorb at least a portion of the vibration transferred to the microphone module 331 and/or the vibration detection sensor 334. For example, the shielding member 333 may include rubber.

According to an embodiment, the shielding member 333 may surround at least a portion of the vibration detection sensor 334. For example, the shielding member 333 may include a supporting area 333b surrounding the vibration detection sensor 334 and a protruding area 333a protruding from the supporting area 333b to the substrate 332. According to an embodiment, at least one of the protruding area 333a or the supporting area 333b of the shielding member 333 may be formed in a closed curve shape. According to an embodiment, the shielding member 333 may be disposed on the substrate 332. According to an embodiment, the protruding area 333a and the supporting area 333b may be compressed to contact the first substrate face 332a of the substrate 332.

According to various embodiments, the waterproofing member 335 may reduce the inflow of moisture or dust into the third sensor 330. For example, the waterproofing member 335 may cover the shielding member 333. The vibration detection sensor 334 may be positioned between the shielding member 333 and the waterproofing member 335. According to an embodiment, the waterproofing member 335 may be coupled, directly or indirectly, to the supporting area 333b of the shielding member 333 using a first adhesive member 336.

According to various embodiments, the third sensor 330 may include at least one of a first adhesive member 336 or a second adhesive member 337. According to an embodiment, the first adhesive member 336 may be positioned between the shielding member 333 and the waterproofing member 335 and may couple the shielding member 333 with the waterproofing member 335. According to an embodiment, the second adhesive member 337 may be positioned in a direction opposite to the first adhesive member 336 with respect to the waterproofing member 335 and may form at least a portion of the outer surface of the third sensor 330. The third sensor 330 may be connected (directly or indirectly) to the housing (e.g., the housings 201 and 202 of FIG. 5) through the second adhesive member 337.

According to various embodiments, the first adhesive member 336 and/or the second adhesive member 337 may absorb at least a portion of vibration. For example, the first adhesive member 336 and the second adhesive member 337 may absorb at least a portion of the sound transferred to the microphone module 331 or at least a portion of residual vibration or irregular vibration transferred to the vibration detection sensor 334. According to an embodiment, the first adhesive member 336 and the second adhesive member 337 may include an anti-vibration material (e.g., a damping sheet) for absorbing at least a portion of vibration.

Referring to FIG. 9, at least one of the waterproofing member 335, the first adhesive member 336, and the second adhesive member 337 may include a through an opening shaped as a through hole.

According to various embodiments, the waterproofing member 335 may be a mesh-shaped tape. For example, the waterproofing member 335 may include waterproofing member openings 352 with a first length 11. For example, the waterproofing member opening 352 may be formed to have a width or a diameter of the first length 11. The waterproofing member opening 352 may be formed in various shapes. For example, although FIG. 9 illustrates a waterproofing member 335 including rectangular waterproofing member openings 352, the waterproofing member openings 352 may be formed in a circular or slit shape. According to an embodiment, the waterproofing member 335 may include a fluorinated carbon resin (e.g., Gore-Tex). For example, the waterproofing member 335 may be formed of polytetrafluoroethylene (PTFE).

According to various embodiments, the first adhesive member 336 may include at least one first opening 362 having a second length 12. For example, the first opening 362 may be formed to have a width or a diameter of the second length 12. According to an embodiment, the resonant frequency of the first adhesive member 336 may be changed based on at least one of the number and shape of the first openings 362. According to an embodiment, the size of the first opening 362 may be greater than the size of the waterproofing member opening 352 of the waterproofing member 335. For example, the second length 12 may be greater than the first length 11.

According to various embodiments, the second adhesive member 337 may include at least one second opening 372 having a third length 13. For example, the third opening 372 may be formed to have a width or a diameter of the third length 13. According to an embodiment, the resonant frequency of the second adhesive member 337 may be changed based on at least one of the number and shape of the second openings 372. According to an embodiment, the size of the second opening 372 may be greater than the size of the waterproofing member opening 352 of the waterproofing member 335. For example, the third length 13 may be greater than the first length 11.

Figure 10:
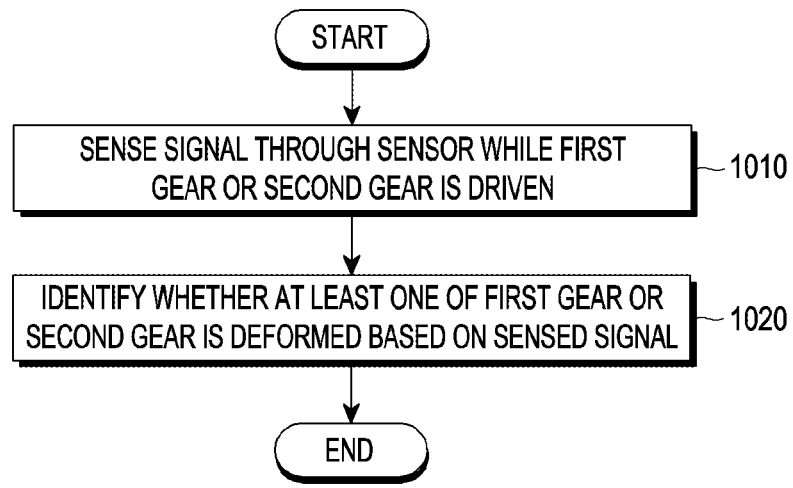
FIG. 10 is a flowchart illustrating an operation of identifying whether a gear is damaged in an electronic device according to an example embodiment.

FIG. 10 is a flowchart illustrating an operation of identifying whether a gear is damaged in an electronic device according to an example embodiment.

According to an embodiment, referring to FIG. 10, in operation 1010, an electronic device (e.g., the electronic device 101 of FIG. 1 or the processor 120 of FIG. 1) may sense a signal through at least one sensor (e.g., the sensor module 176 of FIG. 1) while a first gear (e.g., the first gear 271 of FIG. 7A) or a second gear (e.g., the second gear 272 of FIG. 7A) is driven.

According to an embodiment, at least one sensor may include a first sensor (e.g., a distance sensor or a rotation sensor) that detects whether at least one of the first gear or second gear is driven. For example, the electronic device may detect the moving distance of the first gear or second gear through the distance sensor when the first gear or second gear slides and detect the amount of rotation through the rotation sensor when it rotates.

According to an embodiment, the at least one sensor may include a second sensor (e.g., an accelerometer) for detecting the vibration of at least one of the first gear or second gear when the gear assembly (e.g., 270 of FIG. 7A) is driven.

According to an embodiment, the at least one sensor may further include a third sensor (e.g., the third sensor 330) (e.g., a microphone) for detecting the acoustic signal (e.g., noise) generated from at least one of the first gear or the second gear when the gear assembly is driven.

According to an embodiment, in operation 1020, the electronic device may identify whether at least one of the first gear or second gear is deformed (e.g., wear or damage) based on the sensed signal. For example, if the sensed signal includes at least one sensing value falling outside a set range, the electronic device may identify whether at least one of the first gear or second gear is deformed based on the sensing value of at least one of the first gear or second gear based on the at least one sensing value. According to an embodiment, the signal falling outside the set range among the sensed signals may be denoted as an abnormality signal.

According to an embodiment, if the signal sensed from at least one sensor includes at least one sensing value falling outside the set range, the electronic device may identify whether at least one of the first gear or second gear is deformed based on the at least one sensing value.

For example, the electronic device may identify whether at least one of the first gear or second gear is deformed based on a change in acceleration (e.g., the rotational speed of at least one of the first gear or second gear) obtained through the accelerometer while detecting the driving of at least one of the first gear or second gear through the rotation sensor which detects the amount of the gear or the distance sensor which detects the moving distance of the gear.

According to an embodiment, the first gear may include first gear teeth, and the second gear may include second gear teeth, and the first gear teeth and the second gear teeth may mesh with each other. According to an embodiment, the electronic device may detect a change in acceleration corresponding to vibration due to contact between the first gear tooth and the second gear tooth using the accelerometer.

According to an embodiment, the electronic device may identify whether at least one of the first gear or second gear is deformed based on the moving distance obtained through the distance sensor which detects the moving distance of the gear while detecting the driving of at least one of the first gear or second gear through the rotation sensor which detects the amount of the gear or the distance sensor which detects the moving distance of the gear.

According to an embodiment, the first gear may include first gear teeth, and the second gear may include second gear teeth, and the first gear teeth and the second gear teeth may mesh with each other. According to an embodiment, the electronic device may detect a delay in moving distance corresponding to vibration due to contact between the first gear tooth and the second gear tooth using the distance sensor.

According to an embodiment, the electronic device may identify whether at least one of the first gear or second gear is deformed based on the acoustic signal (e.g., noise) sensed through the microphone while detecting the driving of at least one of the first gear or second gear through the rotation sensor which detects the amount of the gear or the distance sensor which detects the moving distance of the gear.

According to an embodiment, the first gear may include first gear teeth, and the second gear may include second gear teeth, and the first gear teeth and the second gear teeth may mesh with each other. According to an embodiment, the electronic device may detect noise corresponding to vibration due to contact between the first gear tooth and the second gear tooth using the microphone.

According to an embodiment, if the signal sensed while at least one of the first gear or second gear is driven includes, once, at least one sensing value falling outside the set range, the electronic device may determine that the rack gear has been deformed. According to an embodiment, if the sensed signal periodically includes at least one sensing value falling outside the set range, the electronic device may determine that the pinion gear has been deformed.

For example, if an acceleration change value falling outside the set range is included, once, among the acceleration change values obtained through the accelerometer, the electronic device may identify that the rack gear has been deformed. According to an embodiment, if an acceleration change value falling outside the set range is periodically included among the acceleration change values obtained through the accelerometer, the electronic device may identify that the pinion gear has been deformed. According to an embodiment, acceleration change values obtained by the gear being driven and the deformed gear are described below with reference to FIGS. 11A to 11C.

According to an embodiment, the electronic device may determine that among the acceleration change values obtained through the accelerometer, the acceleration change value falling outside the set range, as periodically included, is one due to deformation of a tooth of the pinion gear and determine that the acceleration change values falling outside the set range, other than the periodically included acceleration change value falling outside the set range, are ones due to deformation of a tooth of the rack gear.

According to an embodiment, if a noise with a specific waveform or a magnitude falling outside a set range, among the noises obtained through the microphone, is included once, the electronic device may identify that a tooth of the rack gear has been deformed. According to an embodiment, if the noise with the specific waveform or the magnitude falling outside the set range is included periodically, the electronic device may determine that a tooth of the pinion gear has been deformed.

According to an embodiment, the electronic device may determine that among the noises obtained through the microphone, the periodically included noise with the specific waveform or the magnitude falling outside the set range is one due to deformation of a tooth of the pinion gear and determine that noises with the specific waveform or falling outside the set range, other than the periodically included noise with the specific waveform or falling outside the set range, are ones due to deformation of a tooth of the rack gear.

According to an embodiment, if a change in distance falling outside a set range is included, once, among changes in distance obtained through the distance sensor which detects the moving distance of the gear, the electronic device may identify that the rack gear has been deformed. According to an embodiment, if the change in distance falling outside the set range is periodically included among the changes in distance obtained through the distance sensor, the electronic device may identify that the pinion gear has been deformed. According to an embodiment, changes in distance obtained by the gear being driven and the deformed gear are described below with reference to FIG. 12.

According to an embodiment, the electronic device may determine that among the changes in distance obtained through the distance sensor, the periodically included change in distance, falling outside the set range, is one due to deformation of a tooth of the pinion gear and determine that the changes in distance, falling outside the set range, other than the periodically included change in distance, falling outside the set range, are ones due to deformation of a tooth of the rack gear.

According to an embodiment, the electronic device may obtain the moving distance or amount of rotation of at least one of the first gear or second gear through the distance sensor which detects the moving distance of the gear or the rotation sensor which detects the amount of rotation of the gear and obtain the position of deformation of the first gear or second gear based on the signal sensed using at least one sensor (e.g., the accelerometer, distance sensor, or microphone). For example, when an abnormality signal is sensed while the gear is driven, the electronic device may obtain the position of deformation of at least one of the first gear or second gear based on the moving distance or amount of rotation of the gear at the time when the abnormality signal is sensed.

According to an embodiment, the electronic device may end the driving of the first gear or second gear before or after a driving end area, based on the position of deformation of the first gear or second gear being included in at least one of a driving start area or driving end area. According to an embodiment, the operation of changing the driving end area of the gear by the electronic device is described below with reference to FIG. 13.

According to an embodiment, the electronic device may control the motor (e.g., the motor structure 260 of FIG. 5) to alternately end the driving of the gear in the driving end area, an area therebefore, and an area thereafter.

According to an embodiment, the electronic device may control the motor to drive the first gear or second gear at a first speed and control the motor to drive the first gear or second gear at a second speed slower than the first speed in the position of deformation of the first gear or second gear. According to an embodiment, the operation of adjusting the driving speed of the gear is described below with reference to FIG. 14.

According to an embodiment, upon testing whether the first gear or second gear is deformed, the electronic device may control the display (e.g., the display module 160 of FIG. 1) to display a message related to the test. According to an embodiment, the operation of providing a gear deformation (e.g., damage or wear) test guide by the electronic device is described below with reference to FIGS. 15A to 15C.

According to an embodiment, after testing whether the first gear or the second gear is deformed, the electronic device may control the display to display a message related to the result of the gear deformation. According to an embodiment, the operation of providing a result of gear deformation by the electronic device is described below with reference to FIGS. 16A to 17B.

Figure 11A:
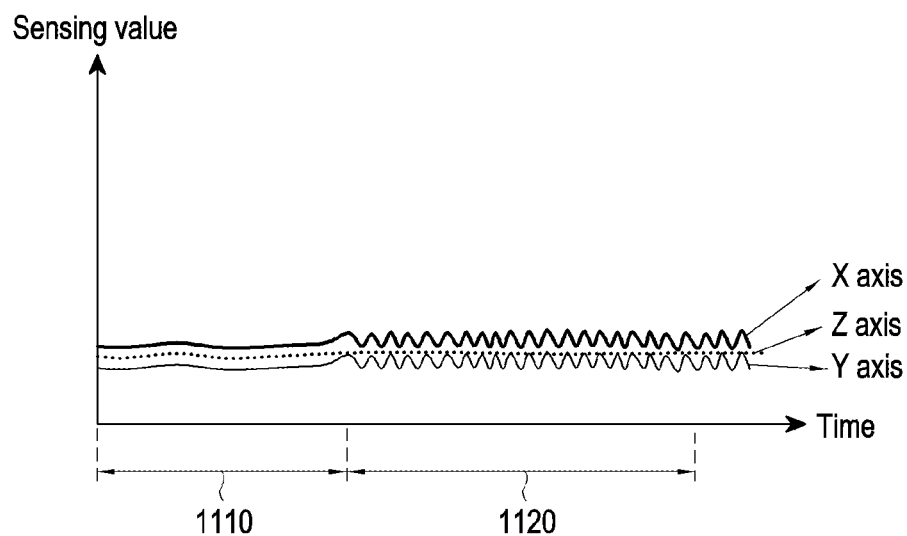
FIG. 11A is a view illustrating a sensing signal when a gear is driven according to an example embodiment.

FIG. 11A is a view illustrating a sensing signal when a gear is driven according to an example embodiment. For example, the sensing value of FIG. 11A is a sensing signal obtained by the accelerometer and may include acceleration changes in the X-axis, Y-axis, and Z-axis.

According to an embodiment, referring to FIG. 11A, the electronic device (e.g., the electronic device 101 of FIG. 1 or the processor 120 of FIG. 1) may obtain a sensing signal through at least one sensor (e.g., the sensor module 176 of FIG. 1) (e.g., the accelerometer, distance sensor or microphone). For example, the sensing signal in the period 1110 when the gear is not driven may include a waveform with a gentle slope, and the sensing signal in the period 1120 when the gear is driven may include a waveform corresponding to a weak vibration generated by the driving of the gear. For example, the sensing value corresponding to the weak vibration has a magnitude within a set range and may be a short-period waveform. According to an embodiment, when deformation of the gear is tested with the electronic device placed on the floor, the Z-axis movement of the sensing signal obtained by the accelerometer may include a waveform with a gentle slope regardless of whether the gear is driven.

Figure 11B:
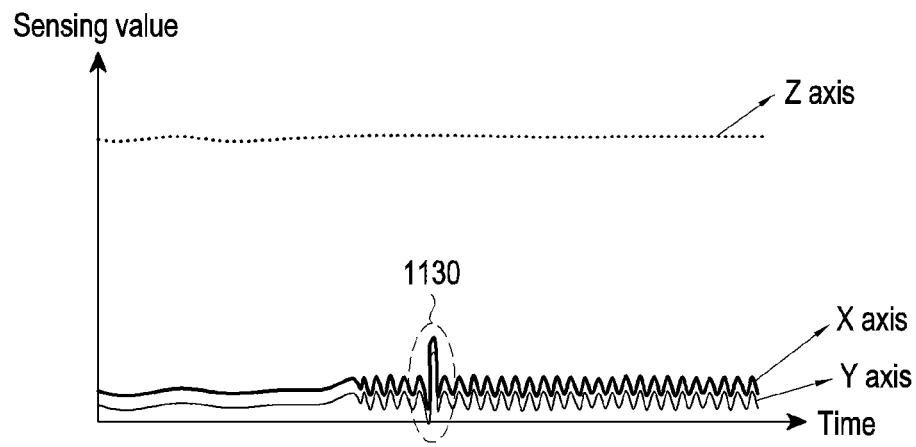
FIG. 11B is a view illustrating a sensing signal obtained when a rack gear is damaged according to an example embodiment.
Figure 11C:
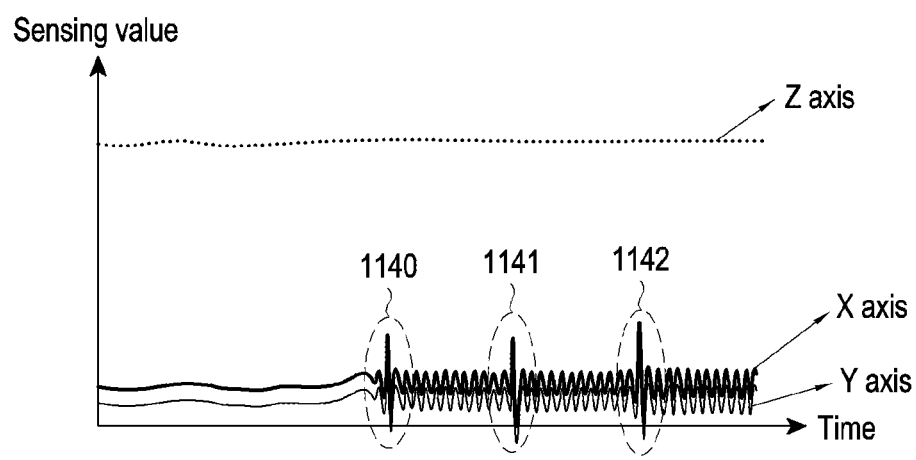
FIG. 11C is a view illustrating a sensing signal obtained when a pinion gear is damaged according to an example embodiment.

According to an embodiment, when a tooth of at least one of the two gears engaged with each other is deformed, or when the deformed tooth is engaged with a tooth of the other gear, the vibration is instantaneously increased and, accordingly, the sensing signal may instantaneously have a large value as shown in FIGS. 11B and 11C.

FIG. 11B is a view illustrating a sensing signal obtained when a rack gear is damaged according to an example embodiment. For example, the sensing value of FIG. 11B is a sensing signal obtained by the accelerometer and may include acceleration changes in the X-axis, Y-axis, and Z-axis.

According to an embodiment, referring to FIG. 11B, the sensing signal may have an instantaneously large abnormal sensing value 1130 in the period when the gear is driven. For example, the abnormal sensing value 1130 may be included once in a weak vibration period based on driving the gear. According to an embodiment, when the abnormal sensing value 1130 is included once, the electronic device may determine that the teeth of the rack gear have been partially deformed.

According to an embodiment, the electronic device may sense the moving distance according to the driving of the rack gear from the driving start area of the rack gear and obtain the position of deformation of the rack gear based on the moving distance of the rack gear at the time of occurrence of the abnormal sensing value 1130.

According to an embodiment, the electronic device may sense the amount of rotation according to the driving of the pinion gear from the driving start area of the pinion gear engaged with the rack gear and obtain the position of deformation of the rack gear based on the amount of rotation of the pinion gear at the time of occurrence of the abnormal sensing value 1130.

FIG. 11C is a view illustrating a sensing signal obtained when a pinion gear is deformed according to an example embodiment. For example, the sensing signal of FIG. 11C is a sensing signal obtained by the accelerometer and may include acceleration changes in the X-axis, Y-axis, and Z-axis.

According to an embodiment, referring to FIG. 11C, the sensing signal may have instantaneously large abnormal sensing values 1140, 1141, and 1142 in the period when the gear is driven. For example, the abnormal sensing values 1140, 1141, and 1142 may be included periodically in a weak vibration period based on driving the gear. According to an embodiment, when the abnormal sensing values 1140, 1141, and 1142 are included repeatedly in a specific period, the electronic device may determine that the teeth of the pinion gear have been partially deformed.

According to an embodiment, the electronic device may sense the amount of rotation according to the driving of the pinion gear from the driving start area of the pinion gear and obtain the position of deformation of the pinion gear based on the amount of rotation of the pinion gear at the time of occurrence of the abnormal sensing values 1140, 1141, and 1142.

According to an embodiment, the electronic device may sense the moving distance according to the driving of the rack gear from the driving start area of the rack gear engaged with the pinion gear and obtain the position of deformation of the pinion gear based on the moving distance of the rack gear at the time of occurrence of the abnormal sensing values 1140, 1141, and 1142.

Figure 12:
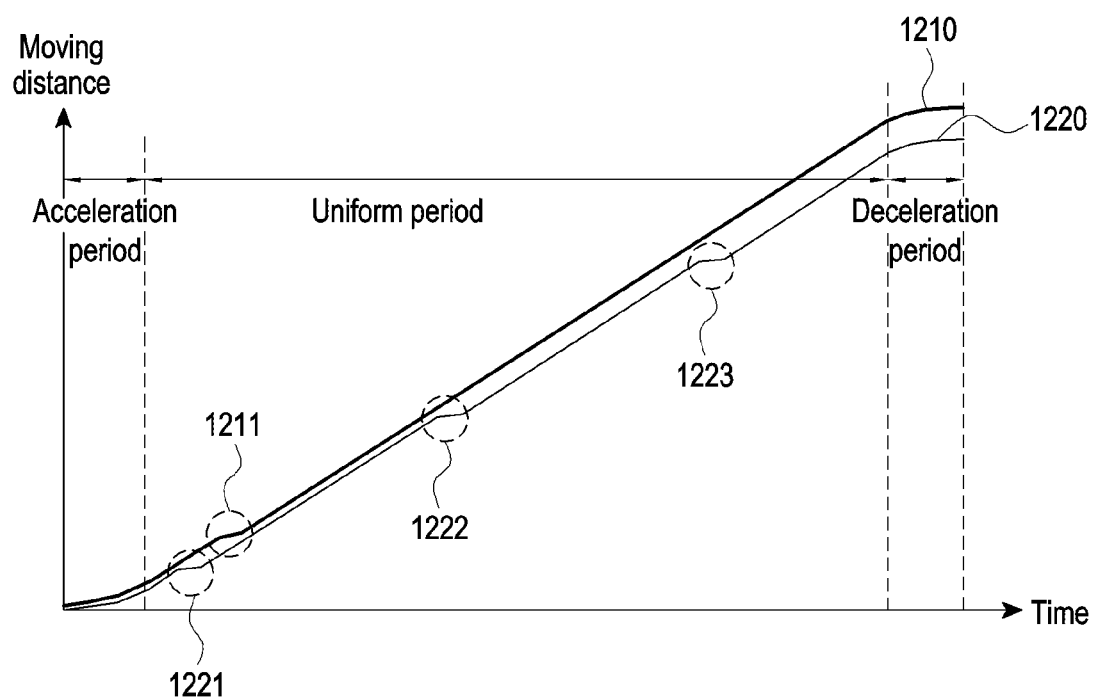
FIG. 12 is a view illustrating a driving speed when a damaged gear is driven according to an example embodiment.

FIG. 12 is a view illustrating a driving speed when a deformed gear is driven according to an example embodiment. For example, the sensing value of FIG. 12 is a sensing signal obtained by the distance sensor, and the electronic device may obtain the driving speed which is the moving distance per time of the rack gear based on the sensing signal.

According to an embodiment, referring to FIG. 12, the electronic device (e.g., the electronic device 101 of FIG. 1 or the processor 120 of FIG. 1) may obtain the sensing signal by which the moving distance of the rack gear has been detected from the distance sensor. For example, the electronic device may obtain the sensing signal for the moving distance of the rack gear, per time, from the start of driving of the rack gear to the end of driving, in the entire extension operation and the entire contraction operation of the housing (e.g., the first housing 201 of FIG. 2 or the second housing 202 of FIG. 2). For example, the sensing signal may include an acceleration period when the driving speed increases to a specific driving speed from the driving starts, a uniform period when the specific driving speed is maintained, and a deceleration period when the driving speed decreases from the specific driving speed to the end of driving.

For example, when the rack gear or the pinion gear is deformed, force transfer temporarily has loss in the deformation period while the gear is driven, so that the driving speed may be temporarily reduced. According to an embodiment, when the sensing signal includes a portion where the driving speed is temporarily reduced, the electronic device may identify that the gear tooth corresponding to the portion where the driving speed is temporarily reduced has been deformed.

According to an embodiment, upon obtaining the sensing signal 1210 including, once, an abnormal portion 1211 where the driving speed is temporarily reduced, the electronic device may identify that the rack gear has been deformed. According to an embodiment, the electronic device may identify the position of the deformed tooth of the rack gear based on the position of the tooth where the driving of the rack gear starts and the moving distance information about the start portion and the abnormal portion 1211.

According to an embodiment, upon obtaining the sensing signal 1220 periodically including abnormal portions 1221, 1222, and 1223 where the driving speed is temporarily reduced, the electronic device may identify that the pinion gear has been deformed. According to an embodiment, the electronic device may identify the position of the deformed tooth of the pinion gear based on the position of the tooth where the driving of the pinion gear starts and the moving distance information about the start portion and the first abnormal portion 1221.

According to an embodiment, upon obtaining a sensing signal including a plurality of abnormal portions 1211, 1221, 1222, and 1223, the electronic device may identify the periodic abnormal portions 1221, 1222, and 1223 in the sensing signal as deformation of the pinion gear and identify the abnormal portion 1211, other than the periodic abnormal portions 1221, 1222, and 1223, as deformation of the rack gear. For example, the period of the abnormal portions 1221, 1222, and 1223 included in the sensing signal may be obtained based on the diameter of the pinion gear, and the number of the abnormal portions 1221, 1222, and 1223 may be obtained based on the diameter of the pinion gear and the length of the rack gear.

Figure 13A:
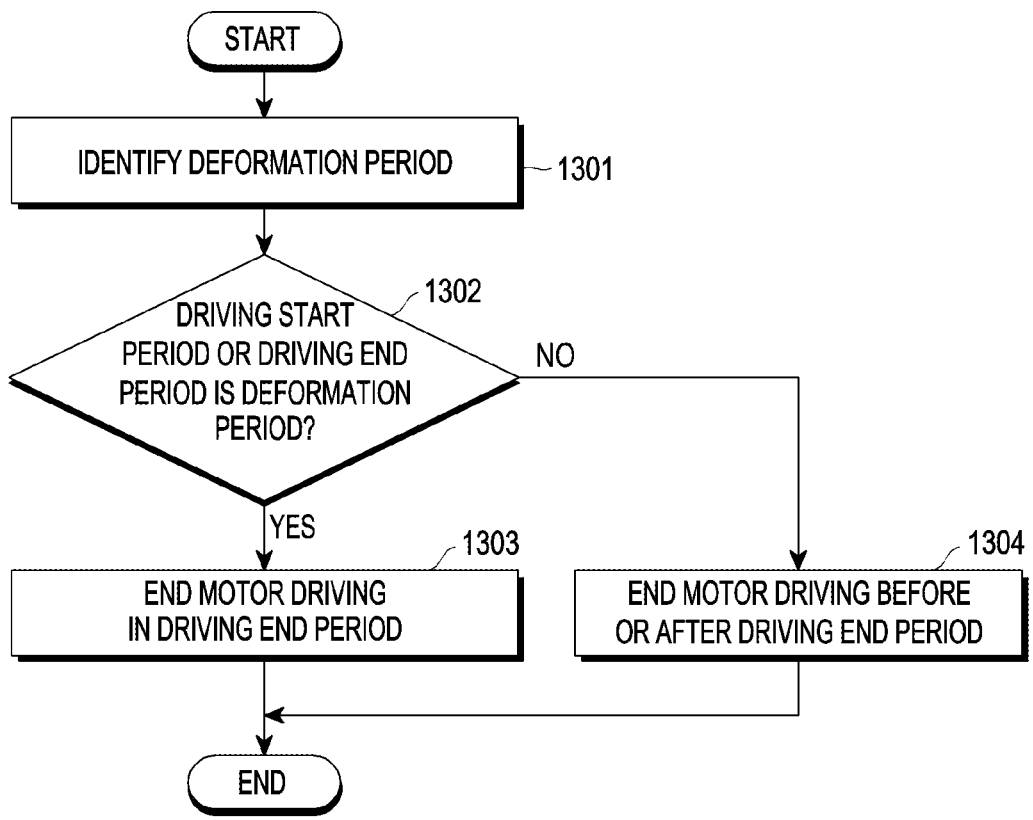
FIG. 13A is a view illustrating an operation of ending driving when a gear is damaged in an electronic device according to an example embodiment.

FIG. 13A is a view illustrating an operation of ending driving when a gear is deformed in an electronic device according to an example embodiment.

Figure 13B:
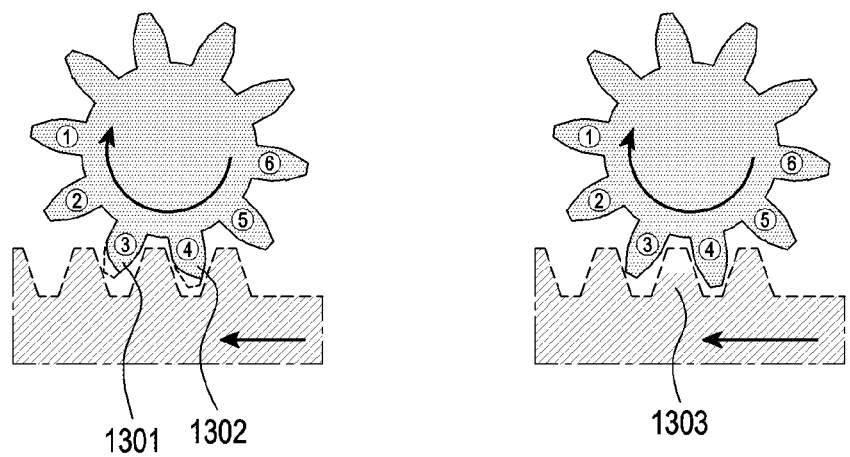
FIG. 13B is a view illustrating an example in which a driving starting period or a driving end period is a damage period according to an example embodiment.

FIG. 13B is a view illustrating an example in which a driving starting period or a driving end period is a deformation period according to an example embodiment.

Figure 13C:
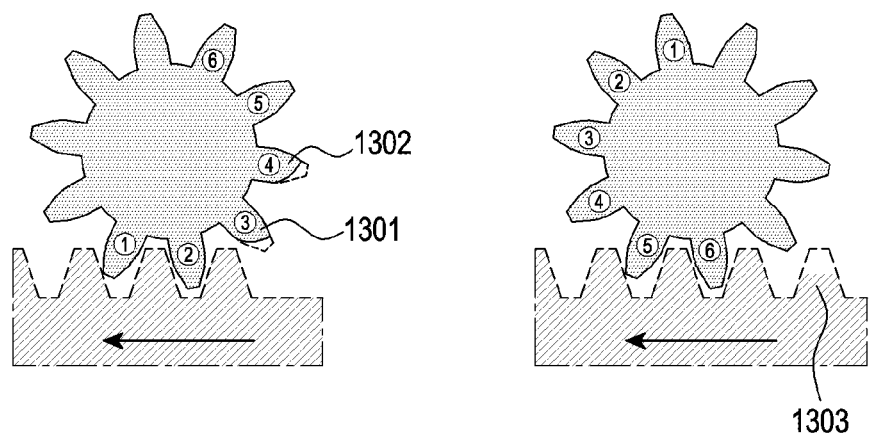
FIG. 13C is a view illustrating an embodiment of ending motor driving before a driving end period according to an example embodiment.

FIG. 13C is a view illustrating an embodiment of ending motor driving before a driving end period according to an example embodiment.

Figure 13D:
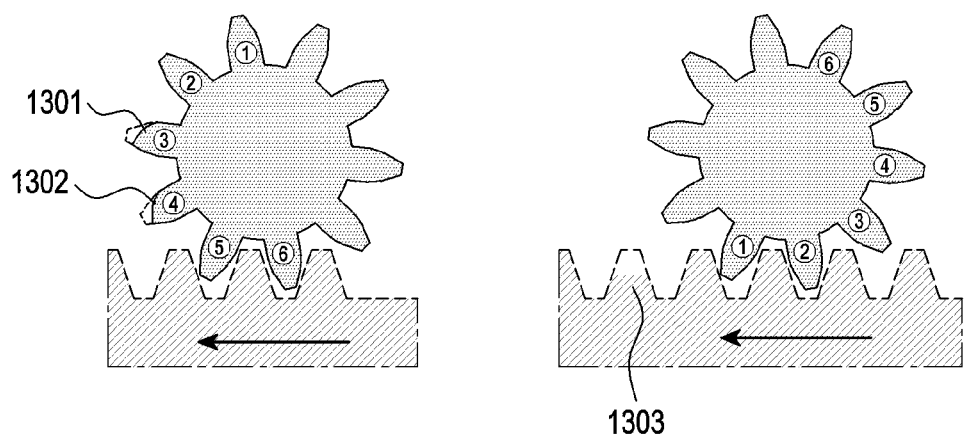
FIG. 13D is a view illustrating an embodiment of ending motor driving after a driving end period according to an example embodiment.

FIG. 13D is a view illustrating an embodiment of ending motor driving after a driving end period according to an example embodiment.

According to an embodiment, referring to FIG. 13A, the electronic device (e.g., the electronic device 101 of FIG. 1 or the processor 120 of FIG. 1) may identify a deformation period in operation 1301. For example, when the sensing signal obtained through at least one sensor (e.g., the sensor module 176 of FIG. 1 (e.g., the accelerometer, distance sensor, or microphone) includes an abnormal signal, the electronic device may identify whether it is the rack gear or pinion gear which has been deformed depending on whether the abnormal signal is a periodic or a one-time one. According to an embodiment, the electronic device may identify the position of deformation of the rack gear or the pinion gear based on the moving distance or amount of rotation of the gear at the time of detection of the abnormal signal.

According to an embodiment, in operation 1302, the electronic device may identify whether the driving start period or driving end period is the deformation period. For example, the electronic device may identify whether the position of deformation obtained through the sensing signal has been included in the driving start period or driving end period of the gear.

According to an embodiment, if the driving start period or driving end period is not the deformation period (no in operation 1302), the electronic device may end the driving of the motor in the driving end period in operation 1303. According to an embodiment, the driving end period may be set at the time of manufacture and may include an area where the two gears are engaged with each other when the driving of the extension or contraction of the housing (e.g., the first housing 201 of FIG. 2 or the second housing 202 of FIG. 2) is ended.

According to an embodiment, if the driving start period or driving end period is the deformation period (yes in operation 1302), the electronic device may end the driving of the motor before or after the driving end period in operation 1304. For example, if the deformed teeth 1301 and 1302 of the pinion gear or the tooth 1303 of the rack gear are included in the driving end period as shown in FIG. 13B, the electronic device may terminate the motor driving before the driving end period as shown in FIG. 13C or end the motor driving after the driving end period as shown in FIG. 13D.

According to an embodiment, referring to FIG. 13C, when the pinion gear is deformed, the electronic device may end the motor driving before the deformed teeth 1301 and 1302 of the pinion gear are engaged with the teeth of the rack gear. For example, the electronic device may end the driving of the motor, one or two gears before the deformed teeth 1301 and 1302 of the pinion gear.

According to an embodiment, when the rack gear is deformed, the electronic device may end the motor driving before the deformed tooth 1303 of the rack gear is engaged with the teeth of the pinion gear. For example, the electronic device may end the driving of the motor, one or two teeth before the deformed tooth 1303 of the rack gear.

According to an embodiment, referring to FIG. 13D, when the pinion gear is deformed, the electronic device may end the motor driving, with the teeth, one or two teeth after the deformed teeth 1301 and 1302 of the pinion gear, engaged with the teeth of the rack gear. For example, the electronic device may end the motor driving after the deformed teeth 1301 and 1302 of the pinion gear are engaged with and then disengaged from the rack gear.

According to an embodiment, when the rack gear is deformed, the electronic device may end the motor driving, with the teeth, one or two teeth after the deformed tooth 1303 of the rack gear, engaged with the teeth of the pinion gear. For example, the electronic device may end the motor driving after the deformed tooth 1303 of the rack gear is engaged with and then disengaged from the pinion gear.

As described above, as driving is ended when a non-deformed tooth is engaged like before or after the driving end period, the initial driving force is applied to a non-deformed tooth when the next driving is performed, preventing or reducing additional deformation and wear to the gear.

FIGS. 13C and 13D illustrate operations after the gear is deformed. However, according to an embodiment, driving may be ended alternately before the gear is deformed, as shown in FIGS. 13B to 13D, preventing or reducing deformation and wear to the gear.

Figure 14:
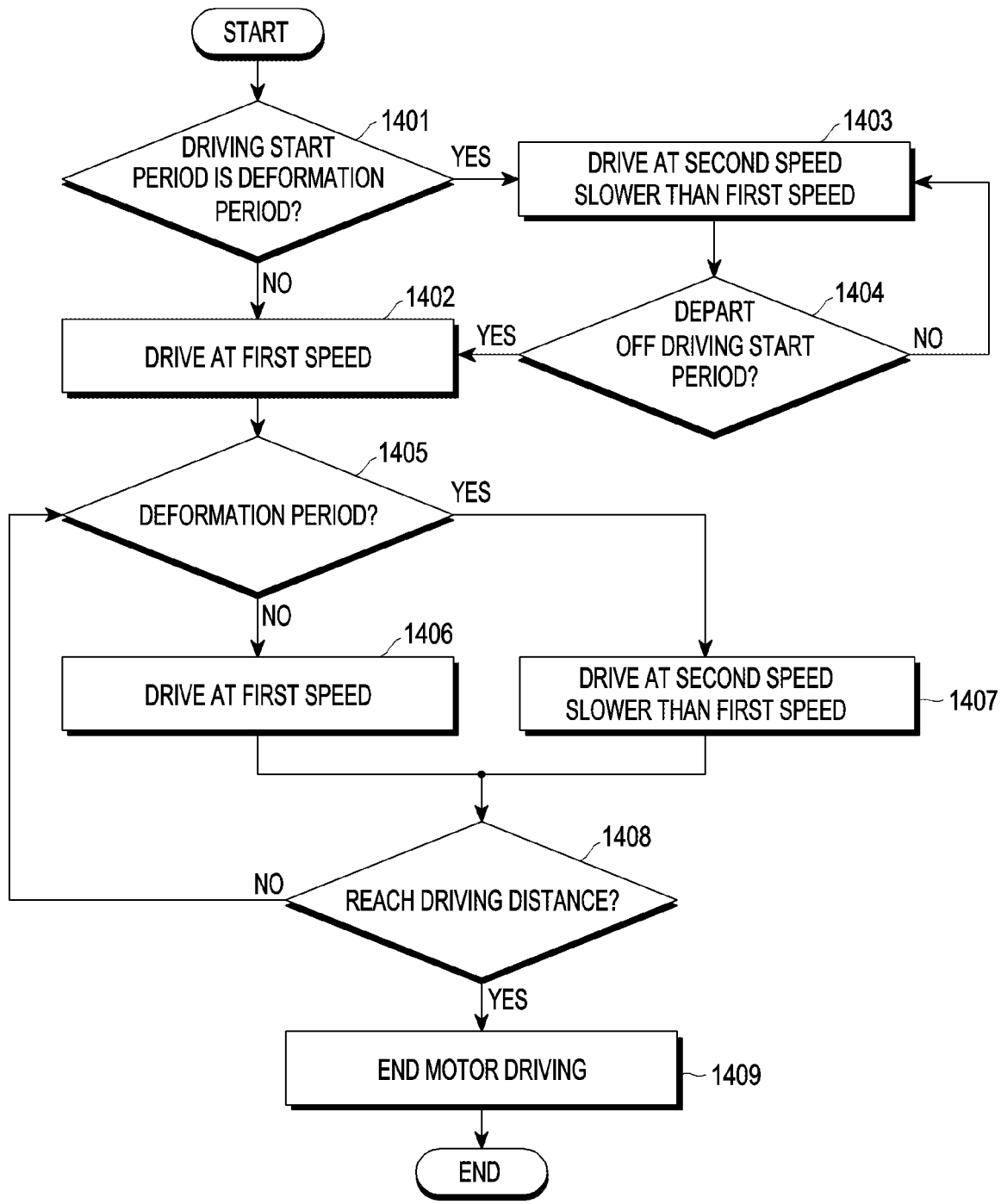
FIG. 14 is a view illustrating an operation of controlling a driving speed when a gear is damaged in an electronic device according to an example embodiment.

FIG. 14 is a view illustrating an operation of controlling a driving speed when a gear is deformed in an electronic device according to an example embodiment.

According to an embodiment, referring to FIG. 14, in operation 1401, the electronic device (e.g., the electronic device 101 of FIG. 1 or the processor 120 of FIG. 1) may identify whether the driving start period is the deformation period. For example, the electronic device may identify whether the teeth of the two gears engaged with each other at the time when the gear driving starts are deformed in the entire extension operation and the entire contraction operation of the housing (e.g., the first housing 201 of FIG. 2 or the second housing 202 of FIG. 2).

According to an embodiment, unless the driving start period is the deformation period (no in operation 1401), the electronic device may drive the gear at a first speed in operation 1402.

For example, the first speed indicates the sliding speed in the extension operation and contraction operation of the housing and may be set at the time of manufacture.

According to an embodiment, if the driving start period is the deformation period (yes in operation 1401), the electronic device may drive the gear at a second speed slower than the first speed in operation 1403. According to an embodiment, the electronic device may adjust the driving speed of the gear depending on the degree of deformation or wear to the gear.

As described above, reducing the driving speed may decrease the force applied to the teeth of the engaged gears when the driving starts, thereby reducing additional deformation and wear to the gear.

According to an embodiment, in operation 1404, the electronic device may identify whether it has departed off the driving start period. For example, the electronic device may identify whether it has departed off the driving start period including the deformation period based on the position of deformation of the gear.

According to an embodiment, when not departing off the driving start period (no in operation 1404), the electronic device may return to operation 1403, keeping on driving the gear at the second speed slower than the first speed.

According to an embodiment, when departing off the driving start period (yes in operation 1404), the electronic device may proceed to operation 1402, restoring the driving speed to the first speed faster than the second speed.

According to an embodiment, in operation 1405, the electronic device may identify whether it is in the deformation period. For example, the electronic device may identify whether the position where the two gears are engaged is the position of deformation, based on the obtained position of deformation and the moving distance or the amount of rotation of the gear.

According to an embodiment, unless the position when the two gears are engaged is the deformation period (no in operation 1405), the electronic device may keep on driving the gear at a first speed in operation 1406.

According to an embodiment, if the position where the two gears are engaged is the deformation period (yes in operation 1405), the electronic device may reduce the driving speed of the gear from the first speed to the second speed slower than the first speed in operation 1407.

According to an embodiment, in operation 1408, the electronic device may identify whether the driving distance has been reached. For example, the electronic device may identify whether the position where the gears are engaged has reached the driving end period. According to an embodiment, unless the driving distance is not reached (no in operation 1408), the electronic device may return to operation 1405, monitoring whether the position where the gears are engaged is the deformation period.

According to an embodiment, if the driving distance is reached (yes in operation 1408), the electronic device may end the motor driving in operation 1409.

As described above, when the position where the gears are engaged, it is possible to reduce additional gear damage or wear by decreasing the driving speed of the gear to thereby reduce the force applied to the gear.

Figure 15A:
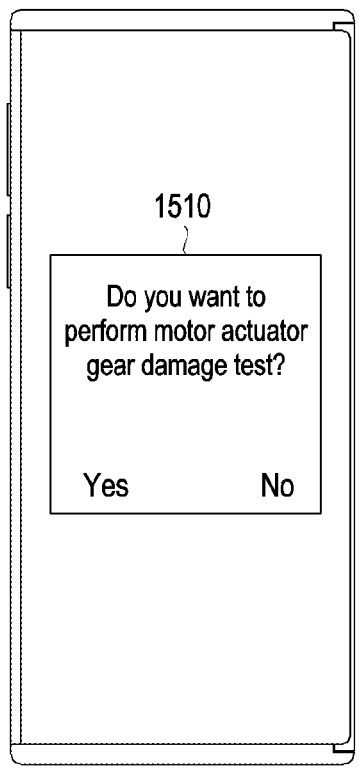
FIG. 15A is a view illustrating an operation of providing a user with a guide for gear damage test in an electronic device according to an embodiment.

FIG. 15A is a view illustrating an operation of providing a user with a guide for gear damage test in an electronic device according to an embodiment.

According to an embodiment, referring to FIG. 15A, the electronic device (e.g., the electronic device 101 of FIG. 1 or the processor 120 of FIG. 1) may control the display (e.g., the display module 160 of FIG. 1) to display a message 1510 identifying whether to perform a gear damage (or wear) test. For example, upon identifying that the gear is damaged based on the sensing signal obtained through at least one sensor (e.g., the sensor module 176 of FIG. 1) or receiving a user input for the gear damage test from the user, the electronic device may control the display to display a message 1510 identifying whether to perform the gear damage test.

Figure 15B:
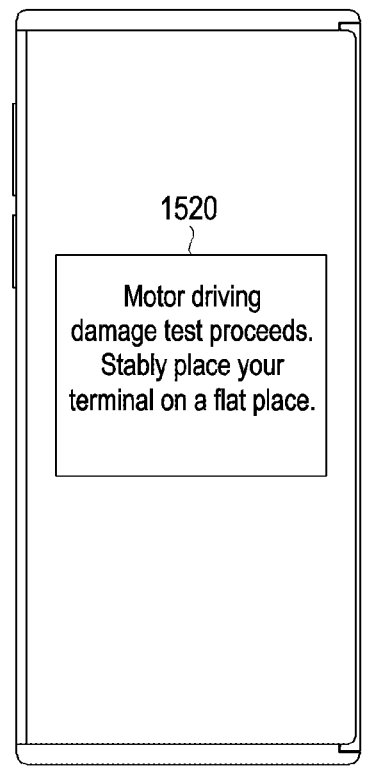
FIG. 15B is a view illustrating an operation of providing a user with a guide for gear damage test in an electronic device according to an embodiment.

FIG. 15B is a view illustrating an operation of providing a user with a guide for gear damage test in an electronic device according to an embodiment.

According to an embodiment, referring to FIG. 15B, the electronic device may control the display to display a message 1510 to lead the electronic device to be positioned on a flat place to perform the gear damage test.

According to an embodiment, when the gear damage test is performed using the microphone, the electronic device may control the display to display a message to lead the test to be performed in a noise-free environment.

Figure 15C:
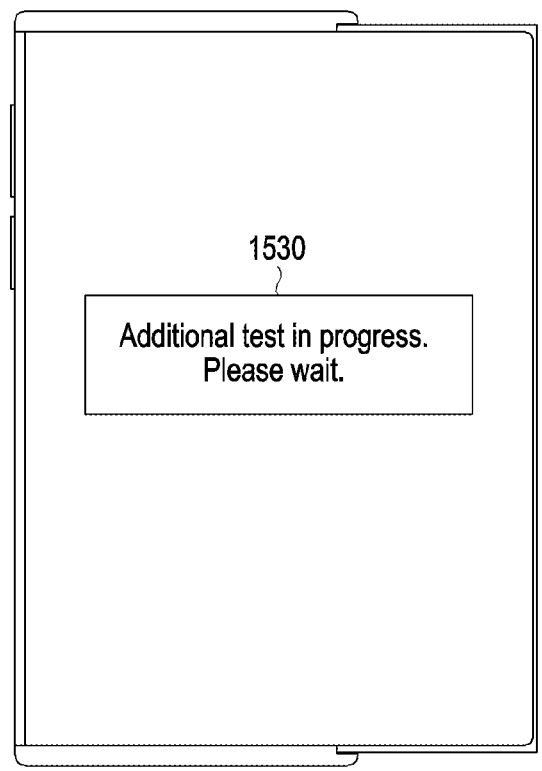
FIG. 15C is a view illustrating an operation of providing a user with a guide for gear damage test in an electronic device according to an embodiment.

FIG. 15C is a view illustrating an operation of providing a user with a guide for gear damage test in an electronic device according to an embodiment.

According to an embodiment, referring to FIG. 15C, the electronic device may control the display to display a message 1530 indicating that the gear damage test is in progress. For example, the electronic device may test whether the gear is damaged while performing the entire extension operation or the entire contraction operation of the housing (e.g., the first housing 201 of FIG. 2 or the second housing 202 of FIG. 2) and display a message 1530 indicating that the test is in progress to prevent or reduce the electronic device from being moved during the test.

According to an embodiment, the electronic device may test whether the gear is damaged while repeating the entire extension operation or the entire contraction test of the housing, thereby reducing errors in the result of whether the gear is damaged or the position of damage.

Figure 16A:
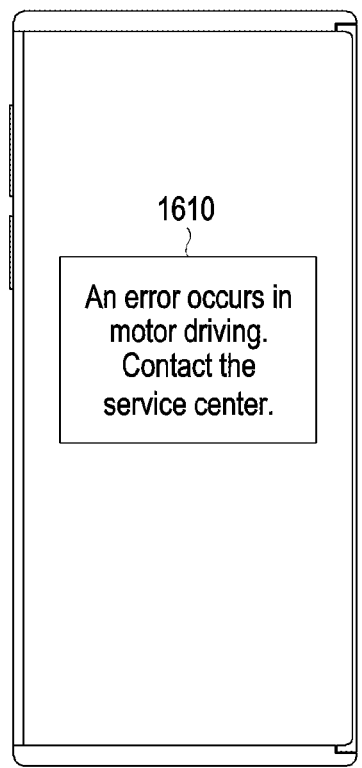
FIG. 16A is a view illustrating an operation of providing a user with a result of gear damage in an electronic device according to an embodiment.

FIG. 16A is a view illustrating an operation of providing a user with a result of gear damage in an electronic device according to an embodiment.

According to an embodiment, referring to FIG. 16A, the electronic device (e.g., the electronic device 101 of FIG. 1 or the processor 120 of FIG. 1) may control the display (e.g., the display module 160 of FIG. 1) to display a message 1610 to lead to a visit to a service center when the degree of damage (or wear) to the gear is severe. For example, when the degree of damage to the gear is severe may indicate when the sensing value obtained through at least one sensor (e.g., the sensor module 176 of FIG. 1) while the extension or contraction operation of the housing (e.g., the first housing 201 of FIG. 2 or the second housing 202 of FIG. 2) is performed is a set value or more.

Figure 16B:
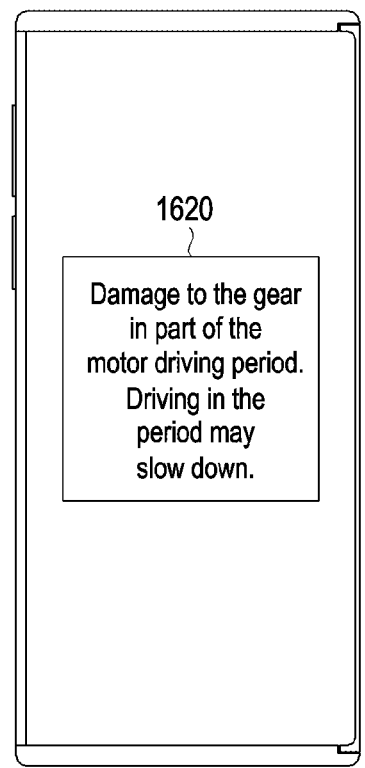
FIG. 16B is a view illustrating an operation of providing a user with a result of gear damage in an electronic device according to an embodiment.

FIG. 16B is a view illustrating an operation of providing a user with a result of gear damage in an electronic device according to an embodiment.

According to an embodiment, referring to FIG. 16A, when the degree of gear damage is not severe, the electronic device (e.g., the electronic device 101 of FIG. 1 or the processor 120 of FIG. 1) may control the display to display a message 1620 indicating that the gear driving speed is adjustable.

According to an embodiment, the electronic device may obtain the life expectancy of the gear based on the degree of damage and control the display to display information about the life expectancy. For example, the electronic device may obtain the life expectancy of the gear based on data related to the life test of the rack gear or pinion gear, stored in the memory (e.g., the memory 130 of FIG. 1).

Figure 17:
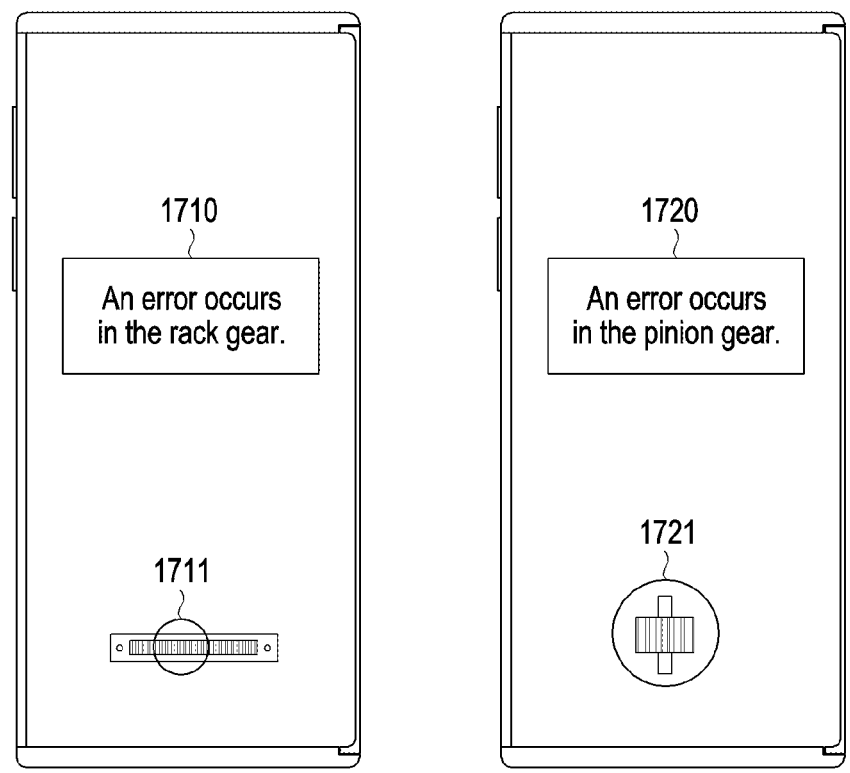
FIG. 17 is a view illustrating an operation of providing a user with a result of gear damage in an electronic device according to an embodiment.

FIG. 17 is a view illustrating an operation of providing a user with a result of gear damage in an electronic device according to an embodiment.

According to an embodiment, referring to FIG. 17A, the electronic device (e.g., the electronic device 101 of FIG. 1 or the processor 120 of FIG. 1) may obtain the type of the damaged (or worn) gear and the position of damage based on the sensing signal obtained through at least one sensor (e.g., the sensor module 176 of FIG. 1) and control the display to display information about the positions 1711 and 1721 of damage and the messages 1710 and 1720 indicating the type of the damaged gear.

In various embodiments, the gear assembly includes the rack gear and the pinion gear but, according to an embodiment, the gear assembly may include a lead and a screw, and the disclosure may also be applicable to the lead screw type.

According to an embodiment, an electronic device (e.g., the electronic device 101 of FIG. 1) may comprise a housing (e.g., the housing 200 of FIG. 1) including a first housing (e.g., the first housing 201 of FIG. 2) and a second housing (e.g., the second housing 202 of FIG. 1) configured to receive at least a portion of the first housing and move with respect to the first housing, a display (e.g., the display module 160 of FIG. 1) configured to be extended based on a slide of the first housing, a motor (e.g., the motor structure 260 of FIG. 6) disposed in the housing, a gear assembly (e.g., the gear assembly 270 of FIG. 6) configured to move the first housing and including a first gear (e.g., the first gear 271 of FIG. 6) connected to the motor and a second gear (e.g., the second gear 272 of FIG. 6) configured to mesh with the first gear, at least one sensor (e.g., the sensor module 176 of FIG. 1) disposed in the housing and configured to detect a driving state of at least a portion of the gear assembly, and at least one processor (e.g., the processor 120 of FIG. 1) operatively connected (directly or indirectly) with the motor and the at least one sensor. The at least one processor may sense a signal related to the driving state of at least the portion of the gear assembly while at least one of the first gear or the second gear is driven, through the at least one sensor and identify whether at least one of the first gear or the second gear is deformed based on the sensed signal.

According to an embodiment, the at least one sensor may include a first sensor detecting whether the at least one of the first gear or the second gear is driven and a second sensor detecting a vibration of the at least one of the first gear or the second gear. The at least one processor, comprising processing circuitry, may identify whether the at least one of the first gear or the second gear is deformed based on a change in a rotational speed of the at least one of the first gear or the second gear detected through the second sensor while it is detected through the first sensor that the at least one of the first gear or the second gear is being driven.

According to an embodiment, the first gear may include first gear teeth, and the second gear may include second gear teeth to mesh with the first gear. The at least one processor may detect the change in the rotational speed of the at least one of the first gear or the second gear, generated by contact between the first gear teeth and the second gear teeth, using the second sensor.

According to an embodiment, the at least one processor may obtain a moving distance or an amount of rotation of the at least one of the first gear or the second gear based on a signal sensed through the first sensor and obtain a position of deformation of the first gear or the second gear based on the change in the rotational speed of the at least one of the first gear or the second gear, obtained using the second sensor, and the moving distance or the amount of rotation.

According to an embodiment, the at least one processor may control the motor to end the driving of the first gear before or after a driving end area, based on the position of deformation of the first gear or the second gear being included in at least one of a driving start area or the driving end area.

According to an embodiment, the at least one processor may control the motor to drive the first gear at a first speed and control the motor to drive the first gear at a second speed slower than the first speed in the position of deformation of the first gear or the second gear.

According to an embodiment, the at least one sensor may further include a third sensor (e.g., the third sensor 330 of FIG. 8) configured to sense an acoustic signal generated when the electronic device is driven. The at least one processor may determine whether the at least one of the first gear or the second gear is deformed based on the acoustic signal sensed through the third sensor.

According to an embodiment, the first gear may include a pinion gear, and the second gear may include a rack gear.

According to an embodiment, the at least one processor may determine that the rack gear is deformed if the at least one sensing value falling outside a set range is included, once, in the sensed signal and determine that the pinion gear is deformed if the at least one sensing value falling outside the set range is periodically included in the sensed signal.

According to an embodiment, the at least one processor may control the display to display a message indicating deformation of the first gear or the second gear.

According to an embodiment, a method for controlling an electronic device (e.g., the electronic device 101 of FIG. 1) including a housing (e.g., the housing 200 of FIG. 2) moved through a gear assembly (e.g., the gear assembly 270 of FIG. 6) including a first gear (e.g., the first gear 271 of FIG. 6) and a second gear (e.g., the second gear 272 of FIG. 6) may comprise sensing a signal related to a driving state of at least a portion of the gear assembly while at least one of the first gear or the second gear is driven, through at least one sensor (e.g., the sensor module 176 of FIG. 1) and identifying whether at least one of the first gear or the second gear is deformed based on the sensed signal.

According to an embodiment, the at least one sensor may include a first sensor detecting whether the at least one of the first gear or the second gear is driven and a second sensor detecting a vibration of the at least one of the first gear or the second gear. Identifying whether the at least one of the first gear or the second gear is deformed may identify whether the at least one of the first gear or the second gear is deformed based on a change in a rotational speed of the at least one of the first gear or the second gear detected through the second sensor while it is detected through the first sensor that the at least one of the first gear or the second gear is being driven.

According to an embodiment, the first gear may include first gear teeth, and the second gear may include second gear teeth to mesh with the first gear. Obtaining the sensing signal may detect the change in the rotational speed of the at least one of the first gear or the second gear, generated by contact between the first gear teeth and the second gear teeth, using the second sensor.

According to an embodiment, sensing the signal may obtain a moving distance or an amount of rotation of the at least one of the first gear or the second gear based on a signal sensed through the first sensor, and identifying whether the at least one of the first gear or the second gear is deformed may obtain a position of deformation of the first gear and/or the second gear based on the change in the rotational speed of the at least one of the first gear or the second gear, sensed using the second sensor, and the moving distance or the amount of rotation.

According to an embodiment, the method may further comprise controlling a motor (e.g., the motor structure 260 of FIG. 6) connected (directly or indirectly) to the gear assembly to end the driving of the first gear before or after a driving end area, based on the position of deformation of the first gear and/or the second gear being included in at least one of a driving start area or the driving end area.

According to an embodiment, the method may further comprise controlling a motor connected to the gear assembly to drive the first gear at a first speed and controlling the motor to drive the first gear at a second speed slower than the first speed in the position of deformation of the first gear or the second gear.

According to an embodiment, the at least one sensor may further include a third sensor (e.g., the third sensor 330 of FIG. 8) configured to sense an acoustic signal generated when the electronic device is driven. Identifying whether the at least one of the first gear or the second gear is deformed may determine whether the at least one of the first gear or the second gear is deformed based on the acoustic signal sensed through the third sensor. "Based on" as used herein covers based at least on.

According to an embodiment, the first gear may include a pinion gear, and the second gear may include a rack gear.

According to an embodiment, identifying whether the at least one of the first gear or the second gear is deformed may determine that the rack gear is deformed if the at least one sensing value falling outside a set range is included, once, in the sensed signal and determine that the pinion gear is deformed if the at least one sensing value falling outside the set range is periodically included in the sensed signal.

According to an embodiment, an electronic device may comprise a housing including a first housing and a second housing configured to receive at least a portion of the first housing and move with respect to the first housing, a display configured to be extended based on a slide of the first housing, a motor disposed in the housing, a gear assembly configured to move the first housing and including a first gear connected (directly or indirectly) to the motor and a second gear configured to mesh with the first gear, at least one sensor disposed in the housing and configured to detect a driving state of at least a portion of the gear assembly, and at least one processor operatively connected (directly or indirectly) with the motor and the at least one sensor. The at least one processor may sense a signal related to the driving state of at least the portion of the gear assembly while the first gear and/or the second gear is driven, through the at least one sensor, identify whether the at least one of the first gear or the second gear is deformed and/or a position of deformation based on the sensed signal, and control the display to display information indicating the identified presence or absence of deformation and/or position of deformation.

It is apparent to one of ordinary skill in the art that an electronic device including a gear assembly according to the disclosure are not limited to the above-described embodiments and those shown in the drawings, and various changes, modifications, or alterations may be made thereto without departing from the scope.

What is claimed is:

1. An electronic device comprising:
   a housing including a first housing and a second housing, wherein the second housing is configured to receive at least a portion of the first housing, and the first housing is configured to move relative to the second housing;
   a display having a display area exposed to outside of the electronic device, wherein a size of the display area is configured to be extended or contracted based on a slide movement of the first housing;
   a motor disposed in the housing;
   a gear assembly configured to move the first housing, wherein the gear assembly includes a first gear connected to the motor and a second gear configured to mesh with the first gear;
   at least one sensor disposed in the housing and configured to detect a driving state of at least a portion of the gear assembly;
   at least one processor operatively connected with the motor and the at least one sensor; and
   memory storing instructions;
   wherein the instructions, when executed by the at least one processor individually or collectively, cause the electronic device to:
   sense, through the at least one sensor, a signal related to the driving state of at least the portion of the gear assembly while the first gear and the second gear are driven, and
   based on the sensed signal, identify whether at least one of the first gear or the second gear is deformed.

2. The electronic device of claim 1, wherein the at least one sensor includes:
   a first sensor configured to detect whether the at least one of the first gear or the second gear is driven, and a second sensor configured to detect a vibration of the at least one of the first gear or the second gear, and
   wherein the instructions, when executed by the at least one processor individually or collectively, cause the electronic device to identify whether the at least one of the first gear or the second gear is deformed based on a change in a rotational speed of the at least one of the first gear or the second gear detected through the second sensor while it is detected through the first sensor that the at least one of the first gear or the second gear is being driven.

3. The electronic device of claim 2, wherein the first gear includes first gear teeth, and the second gear includes second gear teeth configured to mesh with the first gear, and
   wherein the instructions, when executed by the at least one processor individually or collectively, cause the electronic device to detect, via the second sensor, the change in the rotational speed of the at least one of the first gear or the second gear, generated by contact between the first gear teeth and the second gear teeth.

4. The electronic device of claim 3, wherein the instructions, when executed by the at least one processor individually or collectively, cause the electronic device to:
   obtain a moving distance and/or an amount of rotation of the at least one of the first gear or the second gear based on a signal sensed through the first sensor, and
   obtain a position of deformation of the first gear and/or the second gear based on the change in the rotational speed of the at least one of the first gear or the second gear, obtained using the second sensor, and the moving distance and/or the amount of rotation.

5. The electronic device of claim 4, wherein the instructions, when executed by the at least one processor individually or collectively, cause the electronic device to control the motor to end the driving of the first gear before and/or after a driving end area, based on the position of deformation of the first gear and/or the second gear being included in at least one of a driving start area or the driving end area.

6. The electronic device of claim 4, wherein the instructions, when executed by the at least one processor individually or collectively, cause the electronic device to:
   control the motor to drive the first gear at a first speed, and
   control the motor to drive the first gear at a second speed slower than the first speed in the position of deformation of the first gear and/or the second gear.

7. The electronic device of claim 1, wherein the at least one sensor further includes a third sensor configured to sense an acoustic signal generated when the electronic device is driven, and
   wherein the instructions, when executed by the at least one processor individually or collectively, cause the electronic device to determine whether the at least one of the first gear or the second gear is deformed based on the acoustic signal sensed through the third sensor.

8. The electronic device of claim 1, wherein the first gear includes a pinion gear, and the second gear includes a rack gear.

9. The electronic device of claim 8, wherein the instructions, when executed by the at least one processor individually or collectively, cause the electronic device to:
   determine that the rack gear is deformed based on at least one sensing value falling outside a set range being included, once, in the sensed signal, and
   determine that the pinion gear is deformed based on at least one sensing value falling outside the set range being periodically included in the sensed signal.

10. The electronic device of claim 1, wherein the instructions, when executed by the at least one processor individually or collectively, cause the electronic device to control the display to display a message indicating deformation of the first gear and/or the second gear.

11. A method for controlling an electronic device including a housing configured to be moved via a gear assembly including a first gear and a second gear, the method comprising:
sensing, through at least one sensor, a signal related to a driving state of at least a portion of the gear assembly while the first gear and the second gear are driven; and
based on the sensed signal, identifying whether at least one of the first gear or the second gear is deformed,
wherein identifying whether the at least one of the first gear or the second gear is deformed includes identifying whether the at least one of the first gear or the second gear is deformed based on a change in a rotational speed of the at least one of the first gear or the second gear after detecting that the at least one of the first gear or the second gear is being driven.

12. The method of claim 11, wherein the at least one sensor includes a first sensor detecting whether the at least one of the first gear or the second gear is driven, and a second sensor detecting a vibration of the at least one of the first gear or the second gear,
wherein the first gear includes first gear teeth, and the second gear includes second gear teeth configured to mesh with the first gear, and
wherein sensing the signal includes detecting, using the second sensor, the change in the rotational speed of the at least one of the first gear or the second gear, generated by contact between the first gear teeth and the second gear teeth.

13. The method of claim 12, wherein sensing the signal includes obtaining a moving distance and/or an amount of rotation of the at least one of the first gear or the second gear based on a signal sensed through the first sensor, and
identifying whether the at least one of the first gear or the second gear is deformed includes obtaining a position of deformation of the first gear and/or the second gear based on the change in the rotational speed of the at least one of the first gear or the second gear, sensed using the second sensor, and the moving distance and/or the amount of rotation.

14. The method of claim 13, further comprising controlling a motor connected to the gear assembly to end the driving of the first gear before and/or after a driving end area, based on the position of deformation of the first gear and/or the second gear being included in at least one of a driving start area or the driving end area.

15. The method of claim 13, further comprising:
controlling a motor connected to the gear assembly to drive the first gear at a first speed, and
controlling the motor to drive the first gear at a second speed slower than the first speed in the position of deformation of the first gear and/or the second gear.

16. The method of claim 11, wherein the first gear includes a pinion gear, and the second gear includes a rack gear.

17. The method of claim 16, wherein identifying whether the at least one of the first gear or the second gear is deformed includes:
determining that the rack gear is deformed based on at least one sensing value falling outside a set range being included, once, in the sensed signal, and
determining that the pinion gear is deformed based on at least one sensing value falling outside the set range being periodically included in the sensed signal.

18. An electronic device comprising:
a housing including a first housing and a second housing, wherein the second housing is configured to receive at least a portion of the first housing, and the first housing is configured to move relative to the second housing;
a display having a display area exposed to outside of the electronic device, wherein a size of the display area is configured to be extended or contracted based on a slide movement of the first housing;
a motor disposed in the housing;
a gear assembly configured to move the first housing, wherein the gear assembly includes a first gear connected to the motor and a second gear configured to mesh with the first gear;
at least one sensor disposed in the housing and configured to detect a driving state of at least a portion of the gear assembly; and
at least one processor operatively connected with the motor and the at least one sensor;
memory storing instructions;
wherein the instructions, when executed by the at least one processor individually or collectively, cause the electronic device to:
sense, through the at least one sensor, a signal related to the driving state of at least the portion of the gear assembly while the first gear and the second gear are driven,
identify whether at least one of the first gear or the second gear is deformed, and/or a position of deformation, based on the sensed signal, and
control the display to display information indicating at least one of: (a) the identified presence and/or absence of deformation, and/or (b) the position of deformation.

* * * * *